United States Patent
Takaku et al.

(10) Patent No.: US 8,184,866 B2
(45) Date of Patent: May 22, 2012

(54) LIVING BODY GUIDANCE CONTROL METHOD FOR A BIOMETRICS AUTHENTICATION DEVICE, AND BIOMETRICS AUTHENTICATION DEVICE

(75) Inventors: Kazuo Takaku, Inagi (JP); Yasuhiko Mita, Inagi (JP); Naoko Suzuki, Inagi (JP); Shinya Iwasaki, Inagi (JP); Masayuki Yano, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 1248 days.

(21) Appl. No.: 11/854,884

(22) Filed: Sep. 13, 2007

(65) Prior Publication Data

US 2008/0226136 A1 Sep. 18, 2008

(30) Foreign Application Priority Data

Sep. 14, 2006 (JP) ................. 2006-249682

(51) Int. Cl.
*G06K 9/00* (2006.01)
*G06F 21/00* (2006.01)
(52) U.S. Cl. .......... 382/115; 382/126; 713/186
(58) Field of Classification Search .......... 382/124, 382/115, 117, 274, 116, 125, 126; 713/186; 340/5.53, 5.83, 5.52; 705/67; 726/5
See application file for complete search history.

(56) References Cited

U.S. PATENT DOCUMENTS

| 7,471,810 B2* | 12/2008 | Awatsu et al. ........ 382/115 |
| 7,508,958 B2* | 3/2009 | Awatsu et al. ........ 382/115 |
| 7,599,522 B2* | 10/2009 | Ito ...................... 382/115 |
| 7,697,730 B2* | 4/2010 | Okamura et al. ........ 382/115 |
| 7,729,518 B2* | 6/2010 | Awatsu et al. ........ 382/115 |
| 7,742,626 B2* | 6/2010 | Kamata et al. ........ 382/115 |
| 2001/0026632 A1 | 10/2001 | Tamai |
| 2005/0047632 A1 | 3/2005 | Miura et al. |
| 2005/0148876 A1 | 7/2005 | Endoh et al. |
| 2005/0215868 A1 | 9/2005 | Kenjou et al. |

(Continued)

FOREIGN PATENT DOCUMENTS

CN 1674030 A 9/2005

(Continued)

OTHER PUBLICATIONS

Office Action Dated May 8, 2009, issued in corresponding Chinese Patent Application No. 2007101540736.

(Continued)

*Primary Examiner* — Sheela Chawan
(74) *Attorney, Agent, or Firm* — Westerman, Hattori, Daniels & Adrian, LLP

(57) ABSTRACT

A biometrics authentication device identifies characteristics of the body from captured images of the body and performs individual authentication. The device guides a user, at the time of verification, to the image capture state at the time of registration of biometrics characteristic data. At the time of registration of biometrics characteristic data, body image capture state data is extracted from an image captured by an image capture unit and is registered in a storage unit, and at the time of verification the registered image capture state data is read from the storage unit and is compared with image capture state data extracted at the time of verification, and guidance of the body is provided. Alternatively, an outline of the body at the time of registration, taken from image capture state data at the time of registration, is displayed.

21 Claims, 19 Drawing Sheets

U.S. PATENT DOCUMENTS

| | | |
|---|---|---|
| 2006/0023919 A1 | 2/2006 | Okamura et al. |
| 2006/0078170 A1 | 4/2006 | Kamata et al. |

FOREIGN PATENT DOCUMENTS

| | | | |
|---|---|---|---|
| CN | 1726866 A | | 2/2006 |
| EP | 1139301 A2 | | 10/2001 |
| EP | 1519326 A2 | | 3/2005 |
| EP | 1612716 A2 | | 1/2006 |
| JP | 07-146942 | * | 6/1995 |
| JP | 07-146942 A | | 6/1995 |
| JP | 10-127609 A | | 5/1998 |
| JP | 2001273498 A | | 10/2001 |
| JP | 2004151978 A | | 5/2004 |
| JP | 2006107401 A | | 4/2006 |
| JP | 2006-141589 A | | 6/2006 |
| WO | WO 02/077907 A1 | | 10/2002 |
| WO | 2004021884 A1 | | 3/2004 |

OTHER PUBLICATIONS

European Search Report dated Jan. 4, 2008, issued in corresponding European Patent Application No. 07113937.

Japanese Office Action dated Mar. 29, 2011, issued in corresponding Japanese Patent Application No. 2006-249682 (partial English translation).

* cited by examiner

| REGISTRATION DATA N |
|---|
| IMAGE CAPTURE STATE DATA |
|    HAND SILHOUETTE (BITMAP) |
|    ANGLES A1, A2, A3, A4, A5 OF FIVE FINGERS |
|    WIDTHS W1, W2, W3, W4, W5 OF FIVE FINGERS |
|    CONTOURS CA, CB FROM WRIST TO LITTLE FINGER AND FROM WRIST TO THUMB |
| BLOOD VESSEL IMAGE CHARACTERISTIC DATA |

FIG. 11
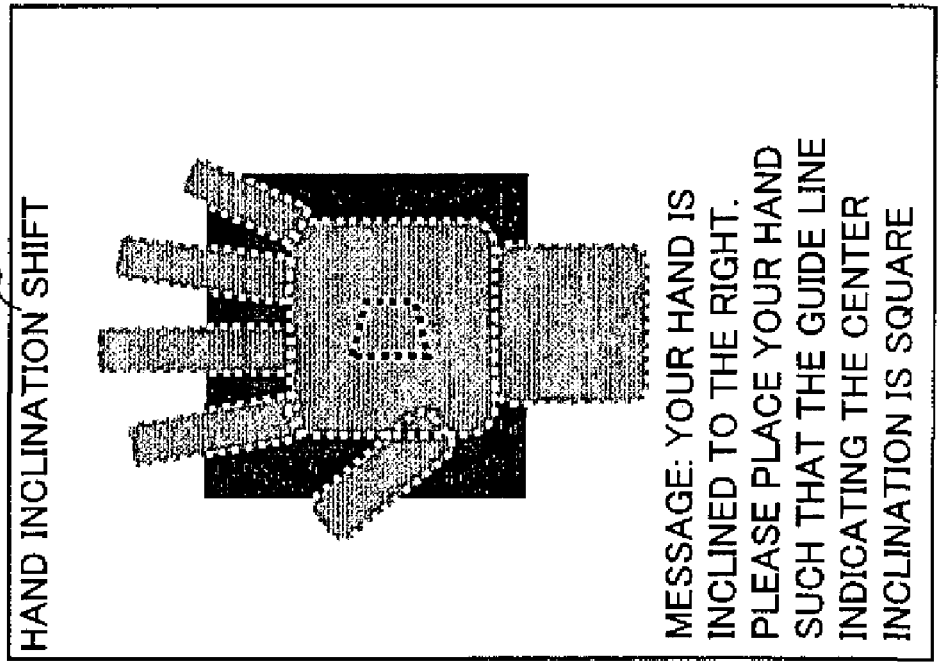
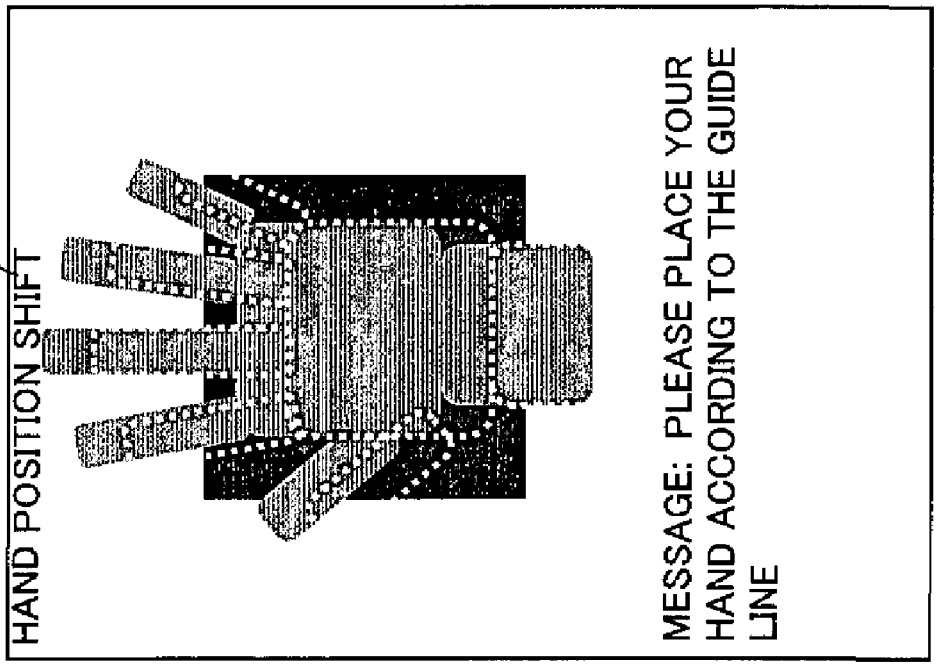

FIG. 12
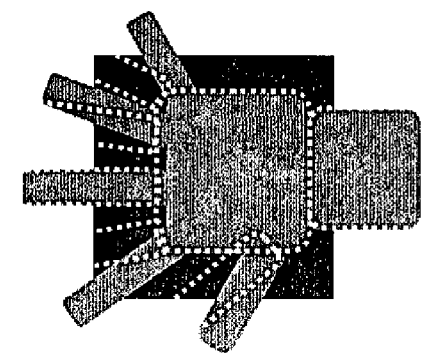
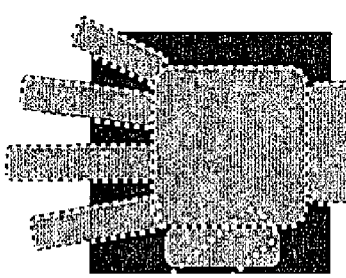
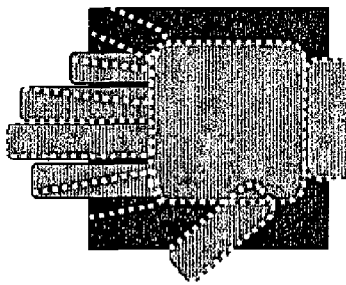

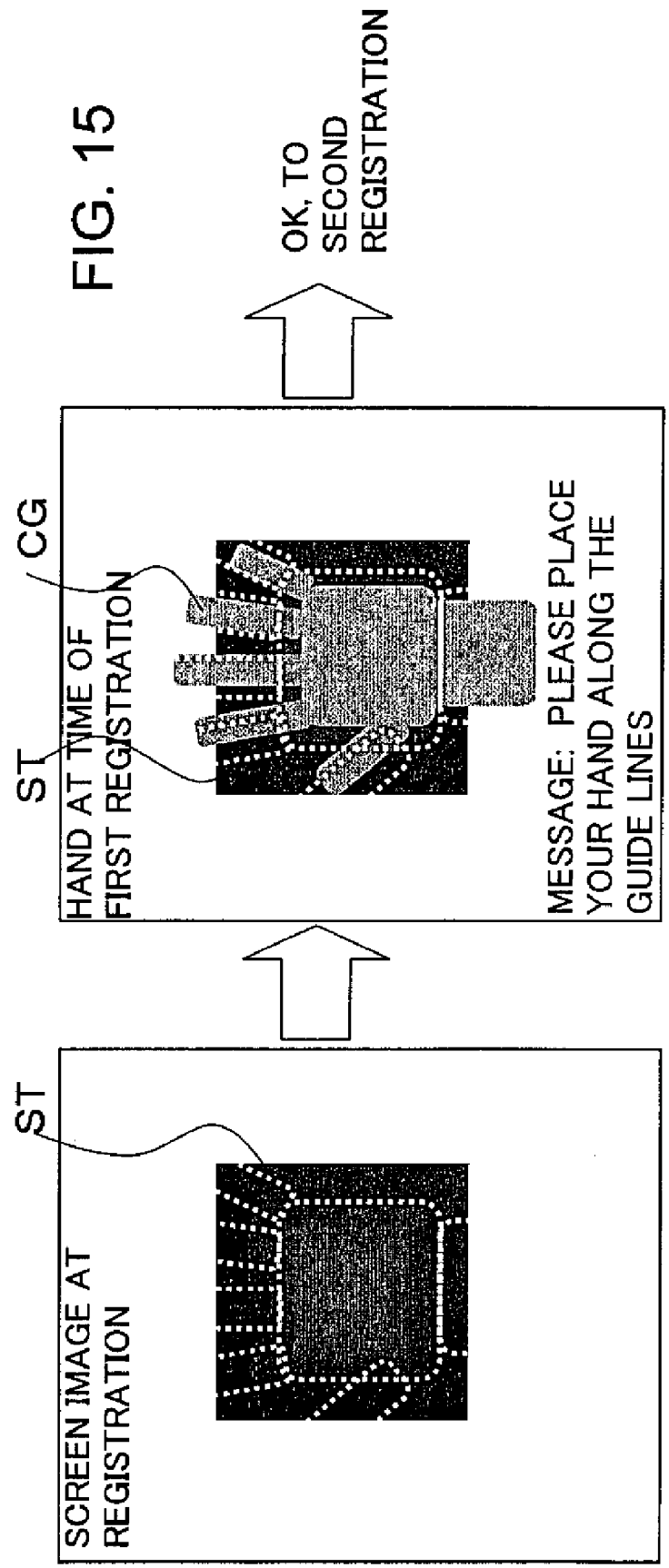

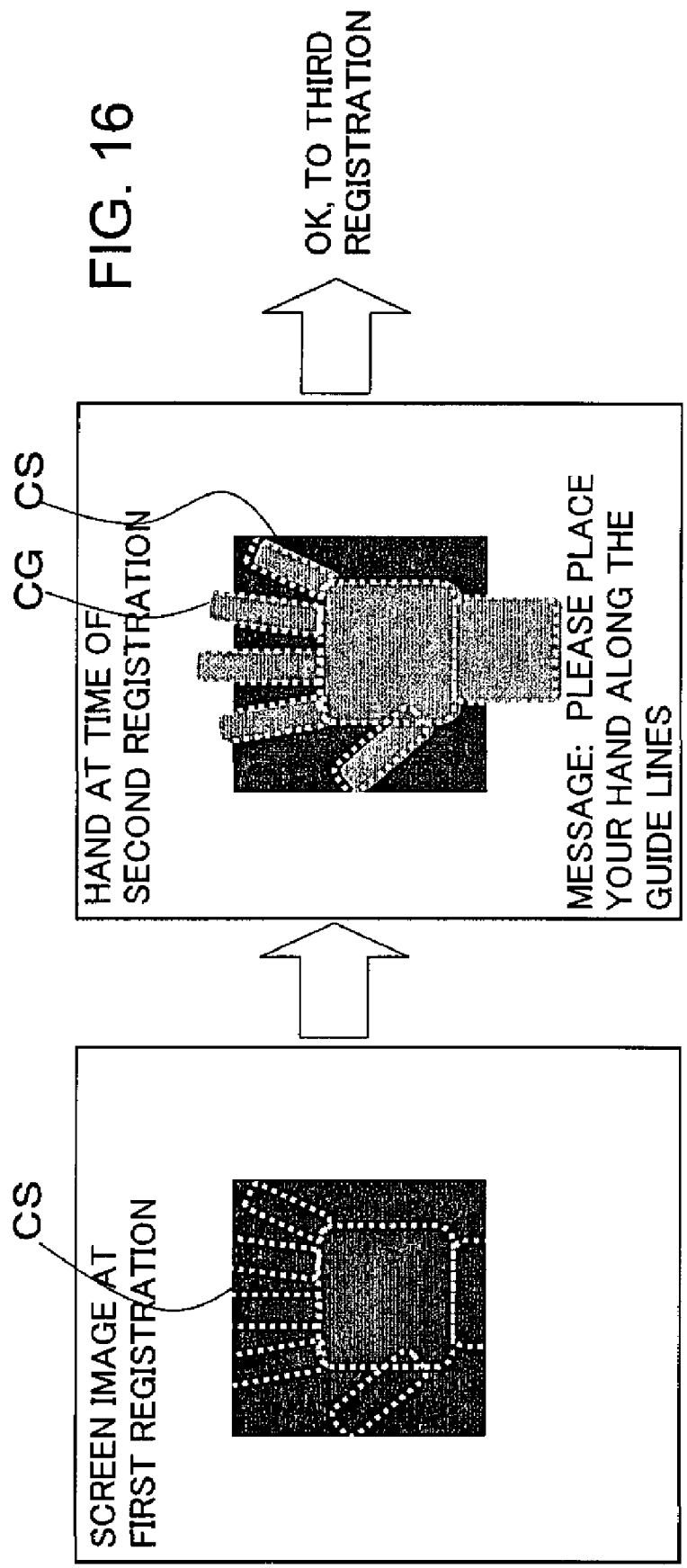

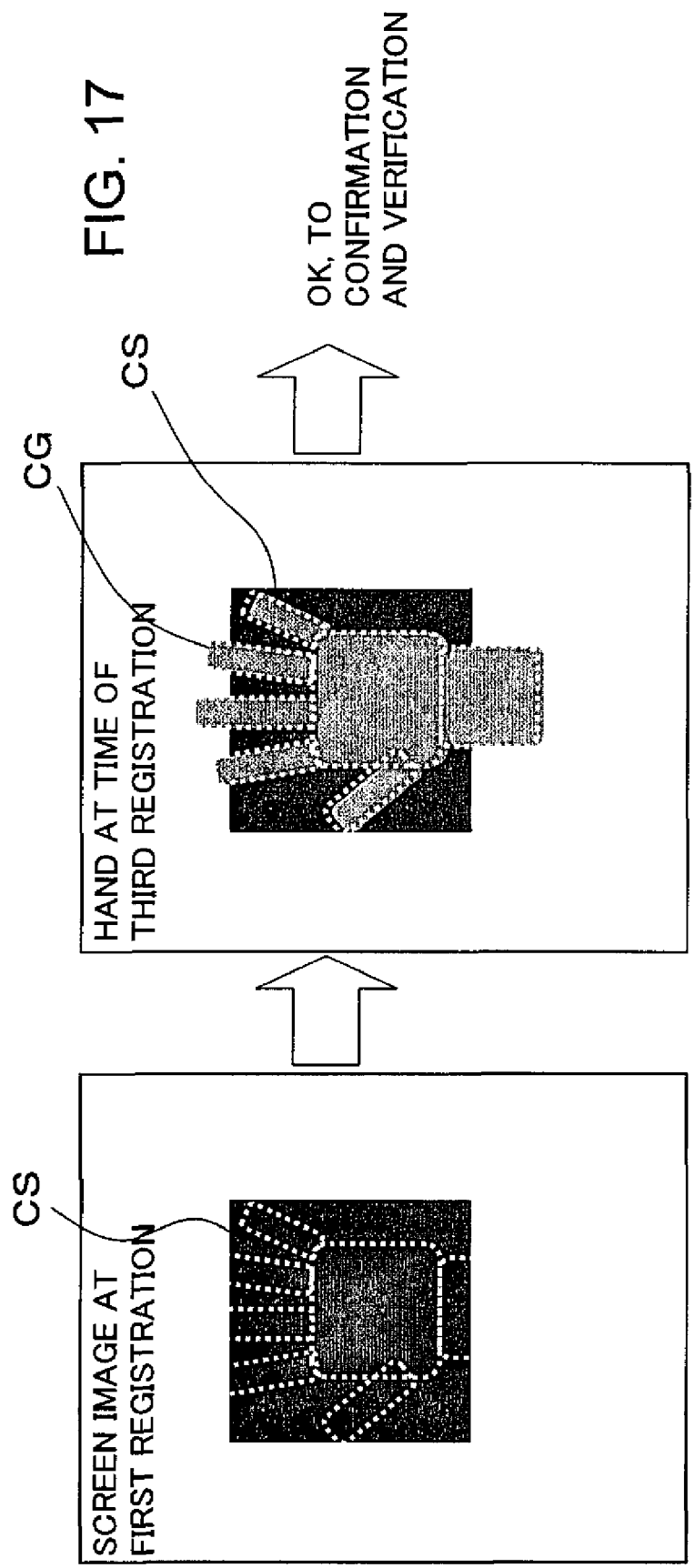

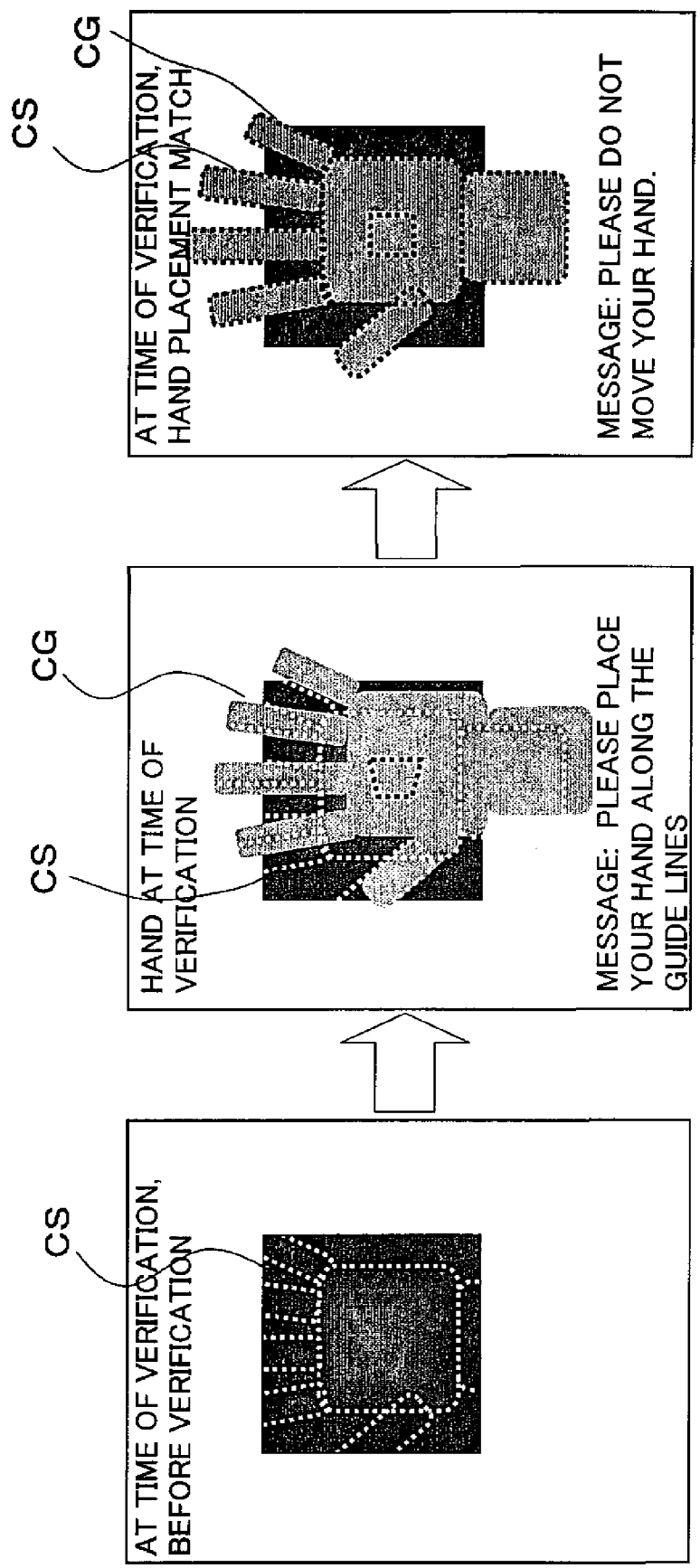

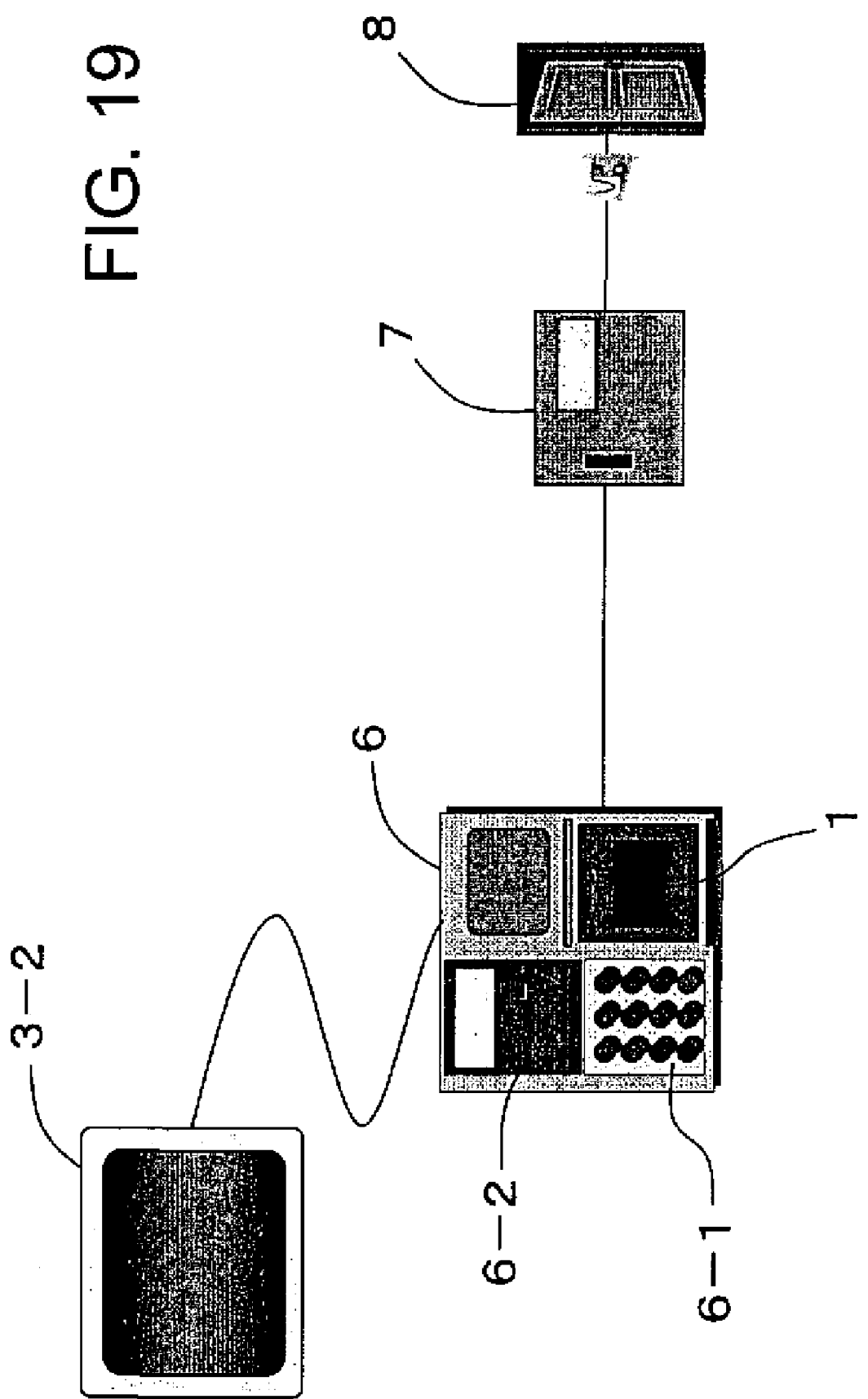

LIVING BODY GUIDANCE CONTROL METHOD FOR A BIOMETRICS AUTHENTICATION DEVICE, AND BIOMETRICS AUTHENTICATION DEVICE

CROSS-REFERENCE TO RELATED APPLICATIONS

This application is based upon and claims the benefit of priority from the prior Japanese Patent Application No. 2006-249682, filed on Sep. 14, 2006, the entire contents of which are incorporated herein by reference.

BACKGROUND OF THE INVENTION

1. Field of the Invention

This invention relates to a living body guidance control method for a biometrics authentication device and to a biometrics authentication device which perform individual authentication by utilize biometrics characteristics, which are characteristics of a portion of the human body, and in particular relates to a living body guidance control method for a biometrics authentication device and to a biometrics authentication device which detect biometrics characteristics by contact-free means to obtain biometrics information.

2. Description of the Related Art

There are numerous portions of the human body which can be used to differentiate the individual, such as fingerprints and toeprints, the retinas of the eyes, facial features, and blood vessels. With advances in biometrics technology in recent years, various devices have come to be offered which recognize biometrics characteristics which are characteristics of such portions of the body to perform individual authentication.

For example, comparatively large amounts of individual characteristic data are obtained from blood vessels in the fingers, palms, and backs of the hands. Moreover, blood vessel (vein) patterns remain unchanged throughout life from infancy and are regarded as being completely unique, and so are well-suited to individual authentication. To take the example of blood vessel images of the palm of a hand, at the time of registration or authentication, the user brings his palm close to an image capture device. The image capture device emits near-infrared rays, which are incident on the palm. The image capture device uses a sensor to receive the near-infrared rays which rebound from the palm.

Hemoglobin in the red corpuscles flowing in the veins has lost oxygen. This hemoglobin (reduced hemoglobin) absorbs near-infrared rays at wavelengths near 760 nanometers. Consequently when near-infrared rays are made incident on the palm of a hand, reflection is reduced only in the areas in which there are veins, and the intensity of the reflected near-infrared rays can be used to identify the positions of veins through contact-free image capture.

The user uses an image capture device to register vein image data of the palm of his own hand in a server or on a card. Then, in order to perform individual authentication, the user employs an image capture device to cause the vein image data of his own hand to be read. The registered vein image retrieved using a user ID or similar is verified against the vein pattern of the vein image for verification thus read, and individual authentication is performed.

In detection of biometrics information by such contact-free means, the body can freely move relative to the image capture device 100, and in particular the hand can be moved freely. On the other hand, the portion of the body for detection must be positioned within the range of image capture of the image capture device in order to enable precise detection.

In the prior art, methods have been proposed in which seals and other means have been used to provide an example of positioning of the hand, the position and inclination of the palm has been detected from captured images, and when precise image capture has not been possible, visible indications and voice output have been used to indicate that the position or inclination of the hand is inappropriate (see for example, WO04/021884 (FIG. 3 and FIG. 15)). In such proposed methods, an image of the entire hand is captured, the image is compared with an average shape of the hand which has been registered, and the position and inclination of the hand are detected.

Further, methods have been proposed in which a judgment is made as to whether the shape of the hand of which an image is captured is appropriate for verification, based on the positions of portions of the palm, such as for example the spreading of the fingers, the position of the wrist, and the position of the entirety of the hand within the image capture range, and in which guidance in positioning the hand is provided to the user (see for example, Japanese Patent Laid-open No. 2006-107401 (Japanese Patent Application 2004-296976)).

In detection of biometrics information by contact-free means, detection is contact-free, and moreover the body, and in particular the hand, fingers and similar can move freely. Hence there are many cases in which the user does not remember the state of image capture of the body part at the time of registration, and so the state of image capture of the body part at the time of authentication is different, and consequently the authentication result is not satisfactory even when the user is the individual in question. If such cases occur frequently, the time required for authentication is increased, and moreover the user, as the individual in question, becomes increasingly distrustful of biometrics authentication.

In methods of the technology of the prior art, in which a common configuration is indicated to the user or a judgment is made as to the appropriateness for verification determined in advance, noise in the biometrics detection device and differences in the detection state at the time of biometrics detection can be eliminated. But because the image capture configuration is not the configuration at the time of registration of the user, there is the concern that the result of verification of registered data against verification data at the time of authentication may not be satisfactory, even if guidance is provided so as to conform to the common configuration.

In other words, there are always individual differences in the image capture configuration. For example, because contact-free detection is used, the size and inclination of the hand of which an image is captured, the spreading of the fingers, and similar may be different at the time of registration and at the time of authentication, and the size of the hand of the individual differs from one person to another (for example, between men and women, and older and younger persons).

Further, because in actuality the human body is detected, changes in physical condition must also be considered; if there are changes in physical condition between the time of registration and the time of authentication, there may be difficulty in authenticating the user at the time of authentication even when the user is the same person, so that problems may arise. For example, in vein authentication, there are numerous causes of changes, such as heartbeat, the timing of image capture, the manner in which the hand is held, and similar.

As a consequence, impediments arise to the spread of biometrics authentication in ubiquitous devices which can be employed by anyone, anywhere, at any time. Moreover, if verification rates are not sufficient, and if problems arise for biological or biometrics reasons, the spread of such technology may be hindered for both users and device manufacturers.

SUMMARY OF THE INVENTION

Hence an object of this invention is to provide a living body guidance control method for a biometrics authentication device and a biometrics authentication device to rapidly perform individual authentication, even when using contact-free means of image capture of the body.

A further object of the invention is to provide a living body guidance control method for a biometrics authentication device and a biometrics authentication device to enable guidance of the body according to the individual user, even when using contact-free means of image capture of the body.

Still a further object of the invention is to provide a living body guidance control method for a biometrics authentication device and a biometrics authentication device to enable guidance of the body according to the individual user, even when using contact-free means of image capture of the body, to improve the speed of authentication.

Still a further object of the invention is to provide a living body guidance control method for a biometrics authentication device and a biometrics authentication device to enable guidance of the body according to the individual user, even when using contact-free means of image capture of the body, to improve the efficiency of verification.

In order to attain these objects, a biometrics authentication device of this invention, which verifies registered biometrics characteristic data for a user against biometrics characteristic data detected from the user's body to perform individual authentication, has an image capture unit which captures an image of the body, a storage unit which stores biometrics characteristic data and body image capture state data for the user, a display unit which displays guidance screens to the user for use in image capture of the body, and a processing unit which extracts the body image capture state data and biometrics characteristic data from the images of the body captured by the image capture unit and registers the data in the storage unit. And the processing unit extracts the body image capture state data from images of the body captured by the image capture unit, compares the extracted body image capture state data with the body image capture state data registered for the user, displays a guidance screen on the display unit according to the comparison result, and verifies the biometrics characteristic data registered for the user against the biometrics characteristic data detected from the body.

Further, a living body guidance control method of a biometrics authentication device of this invention, which verifies registered biometrics characteristic data for a user against biometrics characteristic data detected from the user's body to perform individual authentication, has a step of capturing an image of the body by means of an image capture unit, a step of extracting body image capture state data and the biometrics characteristic data from the image of the body captured by the image capture unit, and of registering the data in a storage unit, a step of extracting the body image capture state data from an image of the body captured by the image capture unit, and of comparing the extracted body image capture state with the body image capture state data registered in the storage unit, a step of displaying, on a display unit, a guidance screen according to the comparison result, and a step of verifying the biometrics characteristic data registered in the storage unit against the biometrics characteristic data detected from the captured image.

Further, a biometrics authentication device of this invention, which verifies registered biometrics characteristic data for a user against biometrics characteristic data detected from the user's body to perform individual authentication, has an image capture unit which captures an image of the body, a storage unit which stores biometrics characteristic data and body image capture state data for the user, a display unit which displays guidance screens to the user for use in image capture of the body, and a processing unit which extracts the body image capture state data and biometrics characteristic data from the images of the body captured by the image capture unit and registers the data in the storage unit. And the processing unit displays on the display unit a guidance screen showing an outline of the body, which is the body image capture state data registered for the user, and verifies the biometrics characteristic data registered for the user against the biometrics characteristic data detected from the body.

Further, a living body guidance control method of a biometrics authentication device of this invention, which verifies registered biometrics characteristic data for a user against biometrics characteristic data detected from the user's body to perform individual authentication, has a step of capturing an image of the body by means of an image capture unit, a step of extracting body image capture state data and the biometrics characteristic data from the image of the body captured by the image capture unit, and of registering the data in a storage unit, a step of displaying, on a display unit, a guidance screen showing an outline of the body, which is the body image capture state data registered in the storage unit, and a step of verifying the biometrics characteristic data registered in the storage unit against the biometrics characteristic data detected from the captured image.

In this invention it is preferable that the processing unit displays on the display unit, as the body image capture state data, an outline of the captured image of the body.

Further, in this invention it is preferable that the processing unit extracts from the captured image of the body, as the image capture state data, body image capture state data which is effective for extracting the biometrics characteristic data.

Further, in this invention it is preferable that the processing unit extracts from the captured image of the body, as the image capture state data, body image capture state data indicating the position of the body in the image capture range of the image capture unit.

Further, in this invention it is preferable that the processing unit extracts, as body image capture state data indicating the position of the body, the position in the horizontal direction and in the vertical direction of the body relative to the image capture unit.

Further, in this invention it is preferable that the image capture unit be constituted by an image capture unit which captures images of a portion of the hand, and that the processing unit extracts an outline of a portion of the hand of which an image is captured, from the captured image, and displays the outline on the display unit.

Further, in this invention it is preferable that the image capture unit be constituted by an image capture unit which captures images of a portion of the hand, and that the processing unit extracts the position of the fingers, which are a portion of the hand of which an image is captured, from the captured image.

Further, in this invention it is preferable that the processing unit extract the angles of the fingers, which are a portion of the hand of which an image is captured, from the captured image.

Further, in this invention it is preferable that the processing unit extracts the position of the wrist, which is a portion of the hand of which an image is captured, from the captured image.

Further, in this invention it is preferable that the processing unit extracts the width of the fingers, which are a portion of the hand of which an image is captured, from the captured image.

Further, in this invention it is preferable that the image capture device capture an image of a portion of the hand including the palm and a portion of fingers of the hand of the body.

Further, in this invention it is preferable that the processing unit displays on the display unit the captured image, superposed on the outline of the captured image of the body.

Further, in this invention it is preferable that after image capture of the body, the processing unit displays on the display unit the captured image, superposed on an outline of the captured image of the body.

Further, in this invention it is preferable that the processing unit displays the outline of the captured image of the body using a dotted line.

In this invention, at the time of registration of biometrics characteristic data, body image capture state data is extracted from a captured image and is registered, and at the time of verification the registered image capture state data is read and is compared with image capture state data extracted at the time of verification to provide guidance for the body. Or, an outline of the body at the time of registration, taken from the image capture state data at the time of registration, is displayed. Therefore, the user can be guided to the individual image capture states at the time of registration, and characteristic data can be extracted. Consequently even when the user has no knowledge of the image capture state at the time of registration, the image capture state at the time of registration can be reproduced at the time of verification, so that contact-free detection of biometrics characteristic data can be performed. In particular, verification failures occurring even when the person is the individual in question can be prevented, and the time required for verification can be shortened, contributing to improve the reliability of biometrics authentication.

BRIEF DESCRIPTION OF THE DRAWINGS

FIG. 3: Diagram of the configuration of the biometrics data of FIG. 1 and FIG. 2.

FIG. 11: Diagram explaining the body image capture state check result of FIG. 10.

FIG. 12: Another diagram explaining the body image capture state check result of FIG. 10.

FIG. 15: (First) diagram explaining body guidance control processing of another embodiment of the invention.

FIG. 16: (Second) diagram explaining body guidance control processing of another embodiment of the invention.

FIG. 17: (Third) diagram explaining body guidance control processing of another embodiment of the invention.

FIG. 18: Diagram explaining body guidance control processing at the time of verification of another embodiment of the invention.

FIG. 19: Diagram of the configuration of the biometrics authentication device of another embodiment of the invention.

DESCRIPTION OF THE PREFERRED EMBODIMENTS

Below, embodiments of the invention are explained, in the order of a biometrics authentication device, biometrics data registration processing, body image capture state extraction and check processing, biometrics authentication processing, other body image capture state guidance processing, another biometrics authentication device, and other embodiments.

Biometrics Authentication Device

Figure 1:
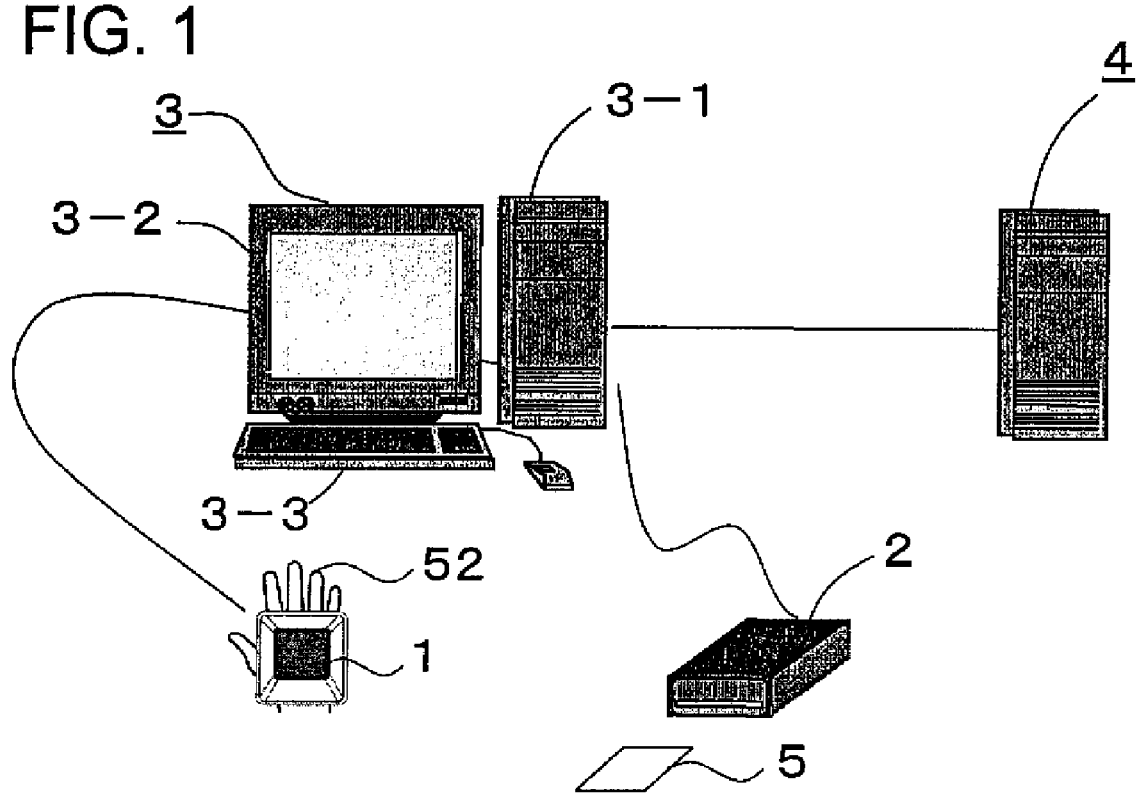
FIG. 1: Diagram of the configuration of the biometrics authentication device of one embodiment of the invention.
Figure 2:
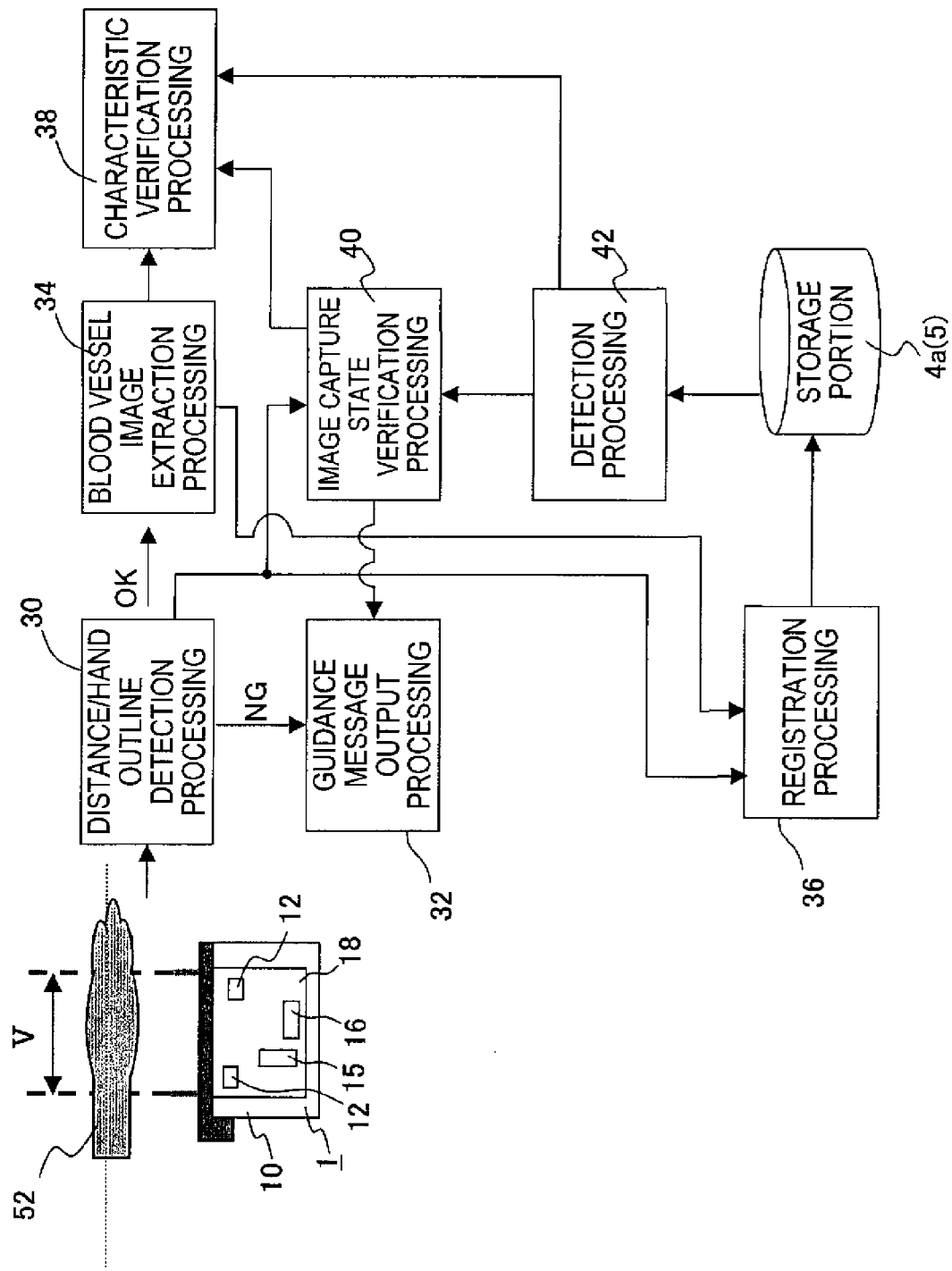
FIG. 2: Block diagram of the biometrics authentication device of FIG. 1.
Figure 4:
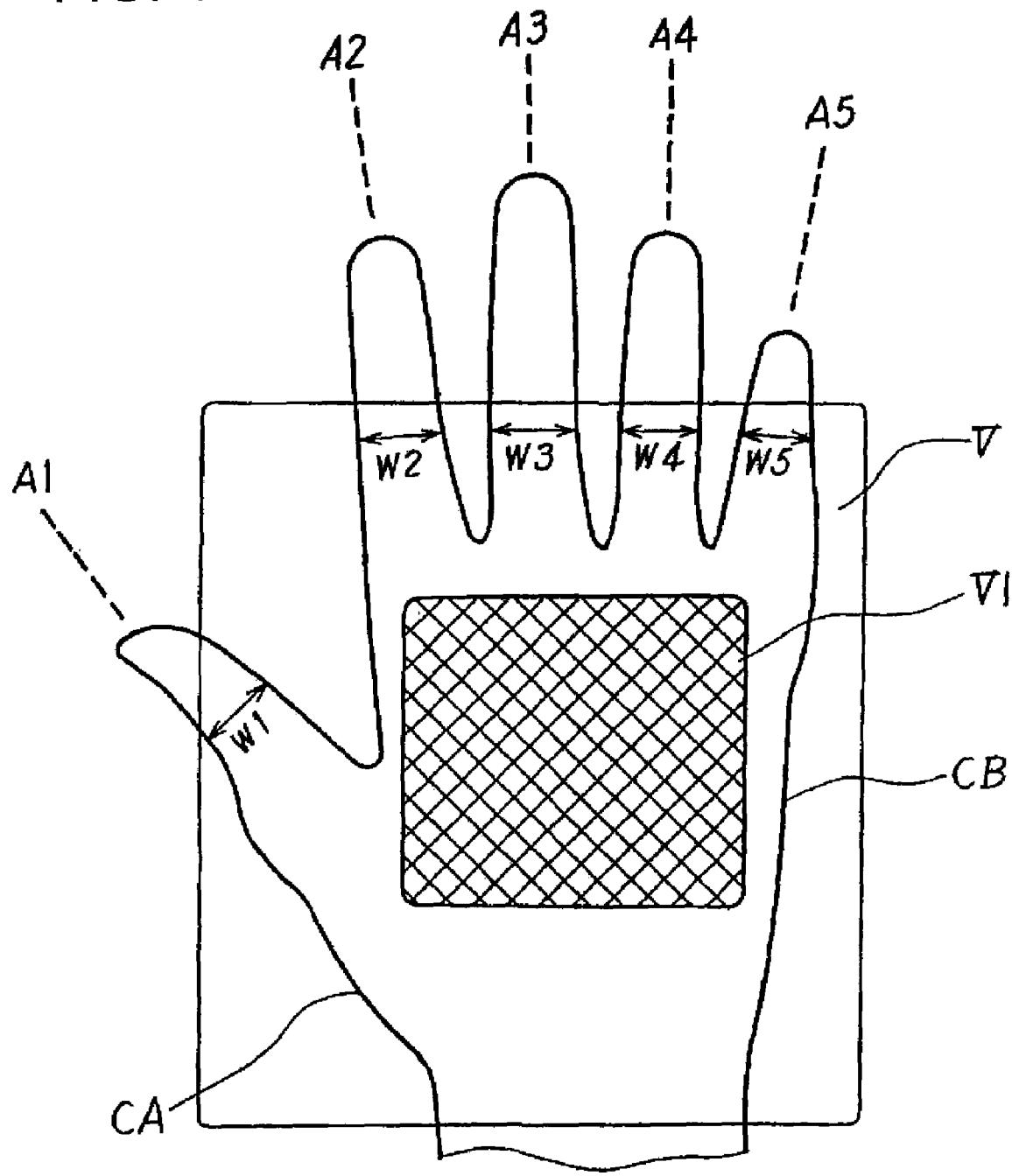
FIG. 4: Explanatory diagram of body image capture state data of FIG. 3.

FIG. 1 shows the configuration of the biometrics authentication device of an embodiment of the invention, FIG. 2 is a block diagram of the palm image capture device and biometrics authentication processing device of FIG. 1, FIG. 3 explains the registered biometrics data of FIG. 1 and FIG. 2, and FIG. 4 explains the body configuration data of FIG. 3.

FIG. 1 shows an example of a palm vein authentication system used to log onto an information system. The personal computer (PC) 3 is connected to a server 4, and executes various processing. This personal computer 3 is connected to a palm image capture device 1 explained in FIG. 2 and an IC card reader/writer 2.

The IC card reader/writer 2 reads and writes data from and to an IC card 5 of the user. The personal computer 3 has a processing unit 3-1, display device 3-2, keyboard 3-3, and similar.

To explain the operation, a user who uses vein (biometrics) authentication to obtain logon approval places his hand over the palm image capture device (hereafter "image capture device") 1. The image capture device 1 reads the palm image, and through blood vessel image extraction processing by the personal computer 3, the vein pattern is extracted and is recorded, as vein data, in a storage portion of the database server 4 connected to the personal computer 3, or on an individual card (hereafter "IC card") 5 held by the user. Upon logon, the system is notified of the initiation of system use, and the system inspects the user name and password, and prepares to accept service requests.

In order to log onto the personal computer 3, the user places his hand over the image capture device 1. The image capture device 1 reads the palm image, and through blood vessel image extraction processing the vein pattern is extracted. The personal computer 3 performs verification processing using the vein pattern as vein data to perform verification against the vein data registered on the database server 4 or on the IC card 5 inserted into the IC card reader/writer 2, to perform individual authentication.

As shown in FIG. 2, the palm image capture device 1 in FIG. 1 is provided with a sensor unit 18 substantially in the center of the main unit 10. The sensor unit 18 is provided with an infrared sensor (CMOS sensor) and focusing lens 16 and a distance sensor 15 in the center; on the periphery thereof are provided a plurality of near-infrared light emission elements (LEDs) 12. For example, near-infrared light emission elements 12 are provided at eight places on the periphery, to emit near-infrared rays upwards.

The readable region V of this sensor unit 18 is regulated by the relation between the sensor, focusing lens, and near-infrared light emission region. A series of registration processing 30 to 42 is executed by the personal computer 3 connected to the image capture device 1. The processing unit 3-1 of the personal computer 3 has, for example, a CPU and various memory units, an interface circuit, and other circuitry necessary for data processing. This CPU executes the series of registration processing 30 to 42.

In distance/hand outline detection processing 30, the distance measured by the distance sensor 15 is received from the image capture device 1, judgments are made as to whether the palm or other object is at a distance within a prescribed range from the sensor unit 18 and whether the inclination is appropriate, an outline of the hand is detected from the image captured by the sensor unit 18, and based on the outline, a judgment is made as to whether the image is an image which can be used in registration and verification processing. For example, the palm may not appear adequately in the image. This processing is explained in detail in FIG. 5 and below.

Figure 5:
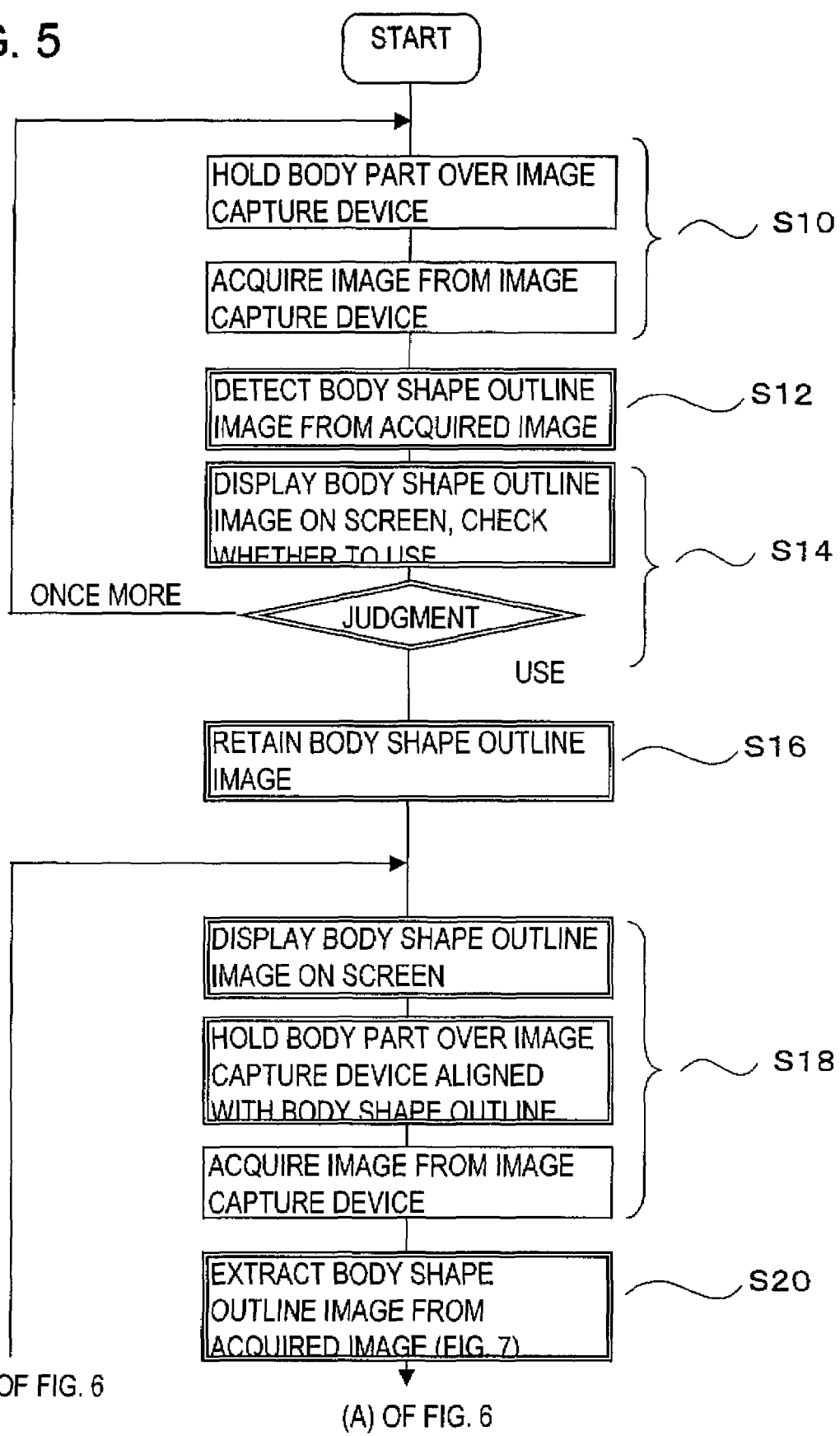
FIG. 5: (First) diagram of biometrics data registration processing flow of an embodiment of the invention.

As shown in FIG. 5 and subsequent figures, guidance message output processing 32 outputs to a display 3-2 of the personal computer 3 a message to guide the palm to the left or right, forward or backward, upward or downward, when the distance measured by the distance sensor 16 indicates that the hand is outside the image capture range, or when the image cannot be used in registration and verification processing. By this means, the hand of the user is guided above the image capture device 1.

Blood vessel image extraction processing 34 extracts a vein image (biometrics characteristic data) from the image of the hand when hand outline detection processing 30 judges that an image has been captured with the hand held correctly. When it is judged that registration is possible, registration processing 36 registers the biometrics characteristic data and the body image capture state data explained in FIG. 3 in the storage portion 4a (storage portion of the server 4 or IC card 5).

At the time of verification, search processing 42 uses a user ID, either input or read from the IC card 5, to retrieve biometrics characteristic data and body image capture state data corresponding to the ID from the storage portion 4a. Characteristic verification processing 38 judges the degree of similarity between the biometrics characteristic data retrieved from the storage portion 4a and blood vessel image data (biometrics characteristic data) extracted in the blood vessel image extraction processing 34 from an image of the hand captured by the image capture device 1, and outputs a verification result.

Image capture state verification processing 40 compares the body image capture state data retrieved from the storage portion 4a with the body image capture state data detected by the distance/outline processing 30 from the image of the hand captured by the image capture device 1, and based on the comparison result, outputs a message from guidance message processing 32 to provide guidance to the image capture state at the time of registration. When the image capture states at the time of registration and at the time of authentication match, the image capture state verification processing 40 starts the characteristic verification processing 38.

FIG. 3 explains the biometrics registration data; biometrics registration data is explained referring to the palm image of FIG. 4. As shown in FIG. 3, registration data N for an individual comprises image capture state data and blood vessel image characteristic data. The image capture state data comprises a silhouette (bitmap) outline of the hand in the image capture range V shown in FIG. 4, the angles A1, A2, A3, A4 and A5 of the five fingers of the hand, the widths W1, W2, W3, W4, W5 of the five fingers of the hand, the contour shape CB from the wrist to the little finger, and the contour shape CA from the wrist to the thumb.

In order to precisely detect blood vessel image data of the palm, it is desirable that the palm be sufficiently opened and flat. To this end, a silhouette (bitmap) of the outline of the hand is used to display the state of image capture of the entire hand at the time of verification and at the time of registration, as explained below.

The angles A1, A2, A3, A4 and A5 of the five fingers of the hand are used to check the openness of each finger. The widths W1, W2, W3, W4 and W5 of the five fingers of the hand are used to check the curvature of each finger. The contour shape CB from the wrist to the little finger and the contour shape CA from the wrist to the thumb are used to check that the wrist is at an appropriate position within the image capture range V.

In this invention, such image capture state data is acquired at the time of registration and is registered in advance, and at the time of verification the image capture state is acquired and the image capture states at the time of registration and at the time of verification are compared, the user is notified of the comparison result, and the user is guided to position is palm in the image capture state of the time of registration. By this means, at the time of verification the user can reproduce the image capture state at the time of registration even when the user is not aware of the image capture state at the time of registration, and contact-free detection of biometrics characteristic data can be performed.

That is, guidance is provided so that the image capture state for each individual at the time of registration can also be reproduced at the time of verification, so that verification failures even when the person is the individual in question can be prevented, and the time required for verification can be shortened, contributing to improved reliability of biometrics authentication.

Here, image capture state data has been explained referring to FIG. 3; but not all the data shown need be used, depending on the degree of precision required. For example, it is effective to use at least one among the angles A1, A2, A3, A4, A5 of the five fingers of the hand, the contour shape CB from the wrist to the little finger, and the contour shape CA from the wrist to the thumb.

Biometrics Data Registration Processing

Figure 6:
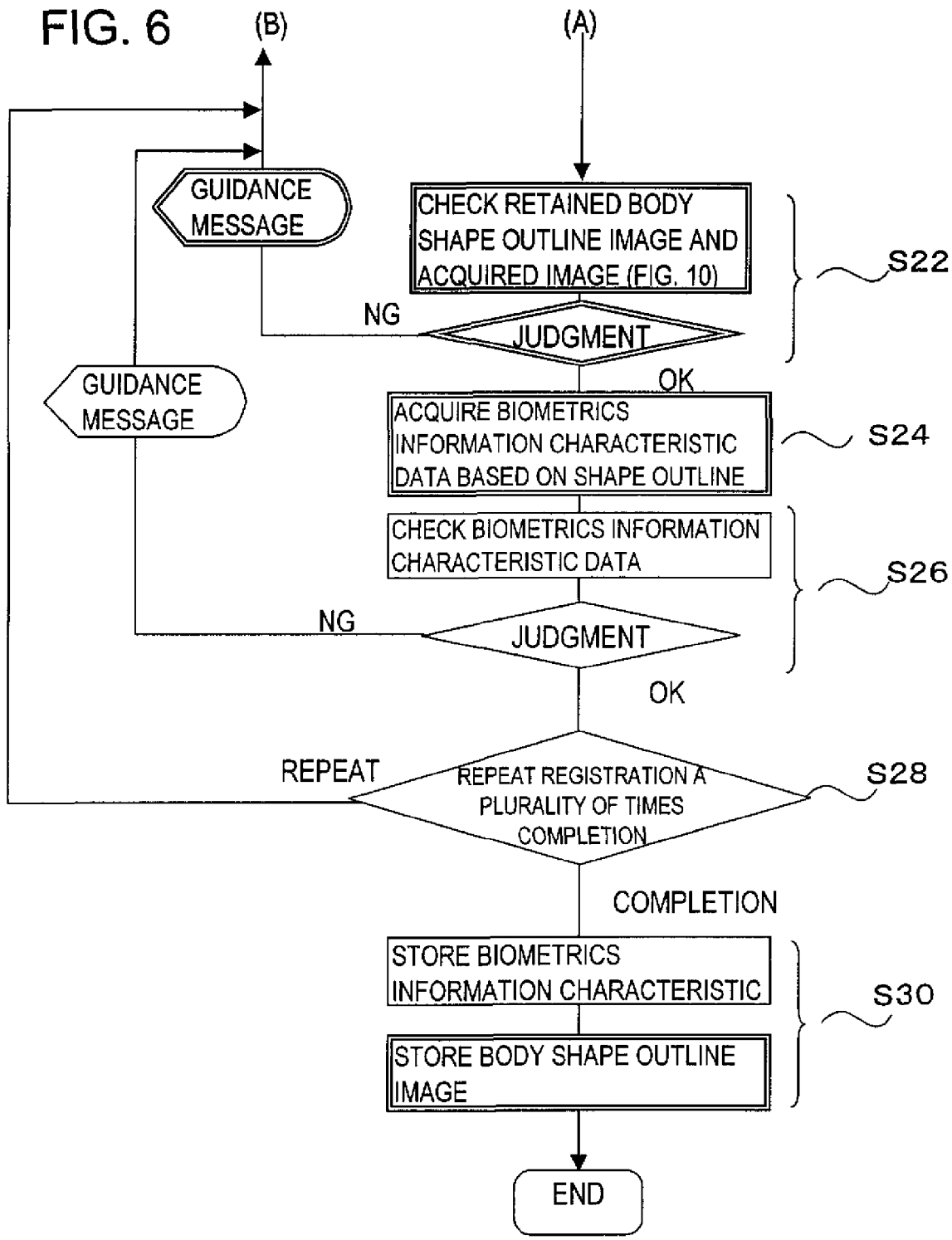
FIG. 6: (Second) diagram of biometrics data registration processing flow of an embodiment of the invention.
Figure 7:
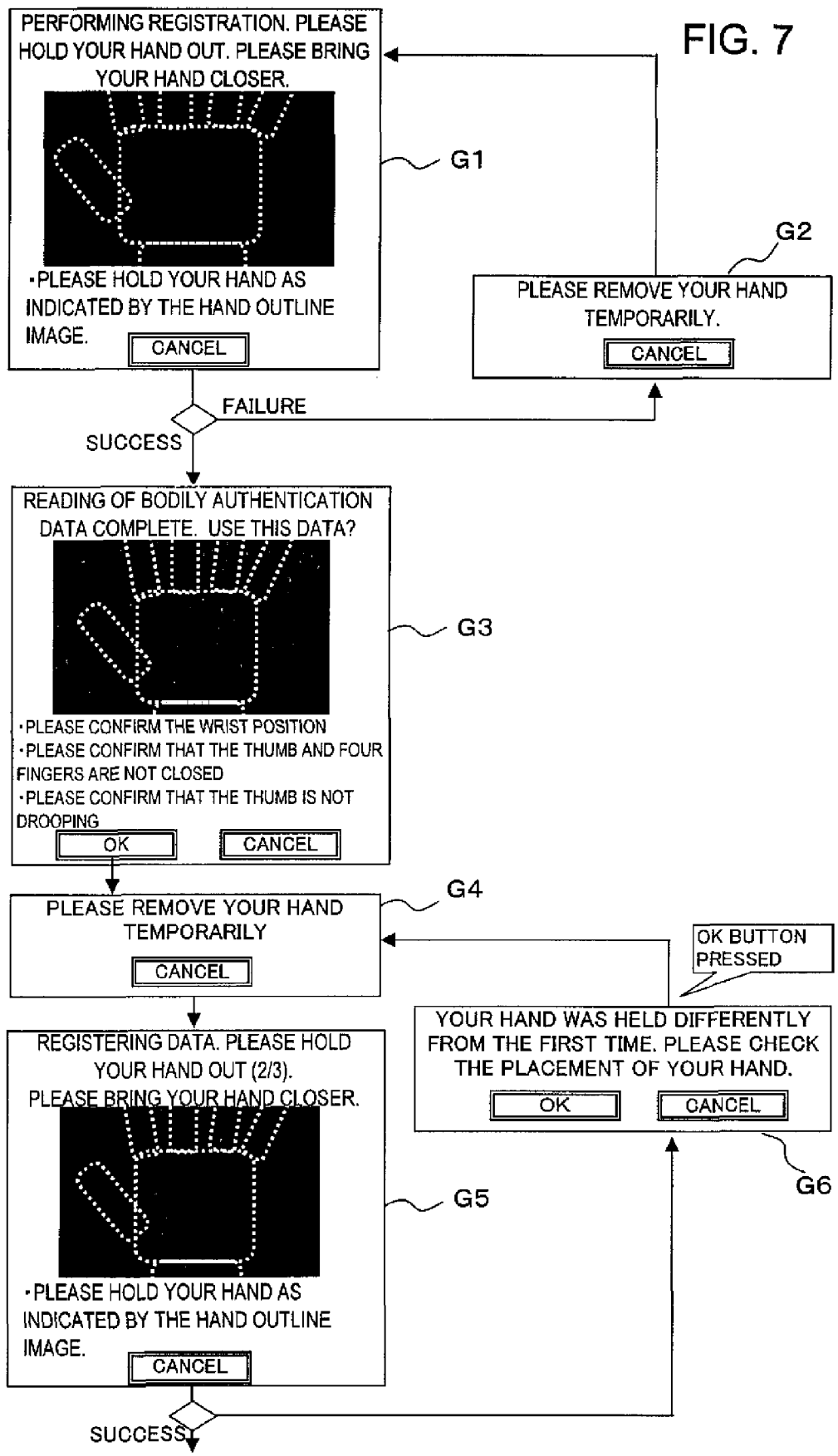
FIG. 7: (First) transition diagram of guidance screens in FIG. 5 and FIG. 6.
Figure 8:
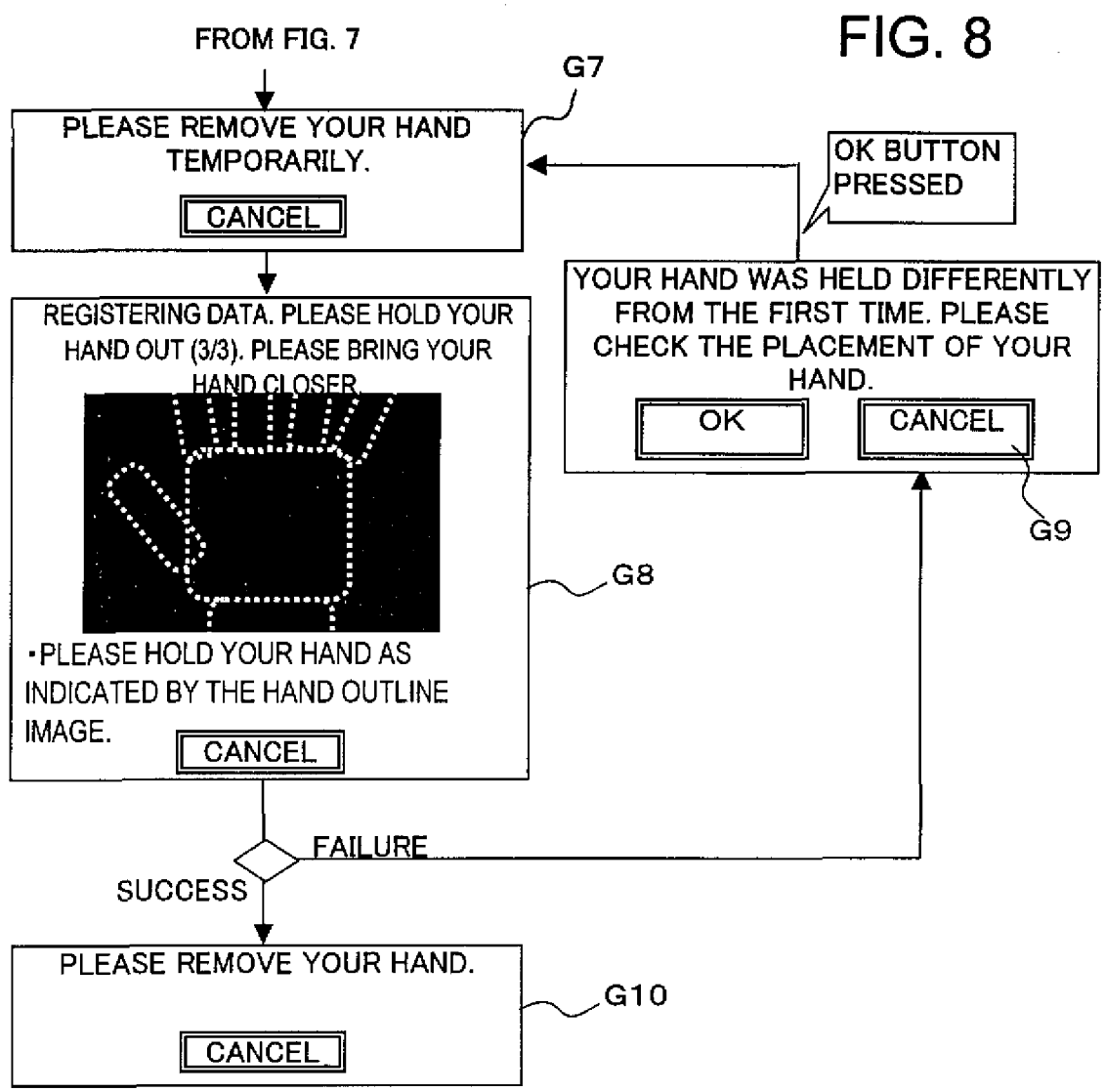
FIG. 8: (Second) transition diagram of guidance screens in FIG. 5 and FIG. 6.

FIG. 5 and FIG. 6 show the flow of biometrics data registration processing in an embodiment of the invention, and FIG. 7 and FIG. 8 are transition diagrams for guidance screens resulting from checks of body image capture states.

The biometrics data registration processing of FIG. 5 and FIG. 6 is explained referring to the guidance screen transitions of FIG. 7 and FIG. 8.

(S10) As shown in FIG. 7, a registration start guidance screen G1 is displayed on the screen of the display device 3-2. This registration start guidance screen G1 uses a dotted line to display a silhouette of a representative palm of the hand, suitable for registration. As shown in FIG. 2, the user places his hand over the image capture device 1. The distance to the palm of the hand is measured by the distance sensor 15, and the output is detected. The detected distance and the focal length determined by the sensor and lens 16 of the sensor unit 18 are compared, and a judgment is made as to whether the distance to the palm of the hand is within an appropriate range. The appropriate range may for example be 40 to 60 mm from the sensor unit 18. In addition, the inclination of the palm of the hand is detected from the distances from a plurality of distance sensors 15, and a judgment is made as to whether the inclination is within an appropriate range. If the distance and inclination are not appropriate, then as shown in FIG. 7, a guidance screen G2 providing guidance to remove the hand is displayed on the display device 3-2. The user is caused to remove his hand from the image capture device 1, and processing returns to the registration start guidance screen G1 in FIG. 7. If on the other hand the distance and inclination are appropriate, the near-infrared rays are emitted from the image capture device 1, the reflected light is received by the sensor 16, and an image of the palm of the hand is obtained.

(S12) An outline image of the palm of the hand is extracted from the image captured by the image capture device 1. That is, as shown in FIG. 4, an image within the outline of the hand within the image capture range V is extracted.

(S14) The outline image is converted into a silhouette showing only the outline, and a readout completed screen G3 is displayed on the display device 3-2 as shown in FIG. 7. The outline of the hand resulting from the silhouette processing is displayed on this screen G3. At this screen G3, the user views the silhouette image of the hand and selects either "OK" or "cancel" to enable or refuse registration. If the user touches "cancel" on the screen G3, a guidance screen G4 is displayed on the display device 3-2 guiding the user to remove his hand, causing the user to remove his hand from the image capture device 1. Processing then returns to step S10.

(S16) If on the other hand the user views the silhouette image of the hand and selects "OK" to enable registration, the body configuration outline image is stored. In this case, as explained below using FIG. 9, the angles A1, A2, A3, A4, A5 of the five fingers of the hand, and the widths W1, W2, W3, W4, W5 of the five fingers of the hand, are calculated from the hand outline image. Then, as shown in FIG. 3, the silhouette image (bitmap) of the hand, the angles A1, A2, A3, A4, A5 of the five fingers of the hand, the widths W1, W2, W3, W4, W5 of the five fingers of the hand, and the contour shape CB from the wrist to the little finger, are stored.

(S18) Next, registration is performed a plurality of times. For this purpose, a re-registration screen G5 is displayed on the display device 3-2, as shown in FIG. 7. On this screen G5, the above-described stored silhouette-processed hand outline is displayed. As shown in FIG. 2, the user again holds his hand over the image capture device 1. The near-infrared rays are emitted from the image capture device 1, the reflected light is received by the sensor 16, and an image of the palm of the hand is obtained.

(S20) An outline image of the palm of the hand is detected from the image captured by the image capture device 1. That is, as shown in FIG. 4, an image of the outline of the hand within the image capture range V is extracted. And, as explained below using FIG. 9, the angles A1, A2, A3, A4, A5 of the five fingers and the widths W1, W2, W3, W4, W5 of the five fingers of the hand are calculated from the silhouette (bitmap) of the hand. Then, as shown in FIG. 3, the silhouette of the hand, the angles A1, A2, A3, A4, A5 of the five fingers, the widths W1, W2, W3, W4, W5 of the five fingers of the hand, the contour CB from the wrist to the little finger, and the contour CA from the wrist to the thumb, are acquired.

(S22) Moving to FIG. 6, the stored body shape outline image and the body shape outline image (image capture state data) acquired in step S20 are compared and checked. Details of this processing are described below using FIG. 10. Upon judgment that there is a mismatch of a portion of the factors (data) between the previously stored body shape outline image (image capture state data) and the body shape outline image (image capture state data) acquired in step S20, the message screen G6 in FIG. 7 indicating that the manner of holding the hand is different is displayed, and processing returns to step S18.

(S24) If on the other hand it is judged that all factors (data) match between the stored body shape outline image (image capture state data) and the body shape outline image (image capture state data) acquired in step S20, then biometrics characteristic data is extracted from the captured image. As shown in FIG. 4, blood vessel image data of the palm of the hand is extracted, as biometrics characteristic data, from the image in the characteristic extraction range V1. In this case, in addition to extracting the blood vessel image itself, image processing may be performed to extract vector components of blood vessels from the blood vessel image.

(S26) When the second blood vessel image extraction is performed, the blood vessel image data of the first extraction and the blood vessel image data of the second extraction are compared, and the degree of similarity is calculated. The degree of similarity is a quantity indicating the extent to which the two blood vessel image patterns match; various pattern matching techniques can be applied. For example, in a grayscale-representation pixel matrix of two blood vessel patterns, the pixel values (grayscale values) of the two patterns for a pixel of interest are acquired and compared. If the two match, a degree of similarity counter is incremented by "1". The pixel of interest is moved, and through similar comparison of pixel values, a judgment is made as to whether there is a match. If the two match, the degree of similarity counter is incremented by "1". This is performed for all the pixels in the pixel matrix, and the degree of similarity counter value is taken to be the degree of similarity. If the degree of similarity is equal to or greater than a threshold value determined in advance, the two are judged to be similar (OK), and it is judged that the blood vessel image data of the second extraction can be registered. Processing then proceeds to step S28. If however the degree of similarity does not exceed the threshold value, then the two are judged not to be similar (NG). Then, similarly to step S22, the repeated operation guidance message G6 is displayed, and processing returns to step S18.

(S28) A judgment is made as to whether the above-described registration of biometrics information characteristic data has been repeated a prescribed plurality of times (for example, three times). When the number of registrations reaches the prescribed number of times, processing returns to step S18. In this case, as shown in the guidance screens of FIG. 8, the re-registration screens G7 and G8 are displayed on the display device 3-2, and when it is judged that there is a mismatch among a portion of the factors (data) of the body shape outline image (image capture state data) stored the previous time and the body shape outline image (image capture state data) acquired in step S20, then the message screen G9 in FIG. 8, indicating that the manner of holding the hand is different, is displayed. If on the other hand there is a match, the completion screen G10 of FIG. 8 is displayed.

(S30) When on the other hand the number of registrations reaches the prescribed number of times, then as shown in FIG. 3, the blood vessel image characteristic data for the number of registrations (for example, three sets of blood vessel image characteristic data) is registered as registration data. And, as shown in FIG. 3, the body shape outline image (image capture state data) is registered. As shown in FIG. 3, this image capture state data comprises a silhouette of the hand, the angles A1, A2, A3, A4, A5 of the five fingers of the hand, the widths W1, W2, W3, W4, W5 of the five fingers of the hand, the contour CB from the wrist to the little finger, and the contour CA from the wrist to the thumb. Then the processing ends.

Thus when acquiring and registering image capture state data at the time of registration, registration is performed a plurality of times, and at the time of each registration the image capture state is verified, the user is notified of the verification result, and the image capture state at the time of registration is rendered uniform for the user. By this means the image capture state for the user at the time of registration can be rendered uniform, and in addition the image capture state for verification can be practiced, and trial authentication can be performed. That is, the user practices the manner of holding the hand for the next verification, and in addition can confirm that authentication using the palm of his own hand can be performed reliably. Hence the sense of confidence in the system is increased, as is the reliability of authentication. Consequently the occurrence of verification failures even when the user is the individual in question can be prevented, and the time for verification can be shortened, contributing to improve the reliability of biometrics authentication.

In addition, the plurality of blood vessel image data sets are detected, and a plurality of (here, three) sets of blood vessel image data with a high degree of similarity are registered as optimum blood vessel image data. Hence even when there are differences in biometrics information due to change of the image capture state by the image capture device, physical condition, or other conditions, the image capture is performed a plurality of times, and only optimum biometrics information with a high degree of similarity, suitable for registration, is registered, so that a plurality of biometrics information sets can be registered reflecting such differences, without leading to a decline in verification accuracy. Moreover, because a large burden is imposed on the person performing registration (the user) should dozens of registration operations be made mandatory, the number of registrations is held to a number which can be performed easily, and only the optimum registration information thus obtained is retrieved and registered in the storage portion.

Here, blood vessel image data for the first registration process is registered to serve as a standard. Among the blood vessel image patterns of the second and subsequent registrations, two blood vessel image data sets with a high degree of mutual similarity are registered. Because the set of the initial registration is used as a standard, a limitless series of similarity calculations and judgments can be prevented.

Body Image Capture State Extraction and Check Processing

Figure 9:
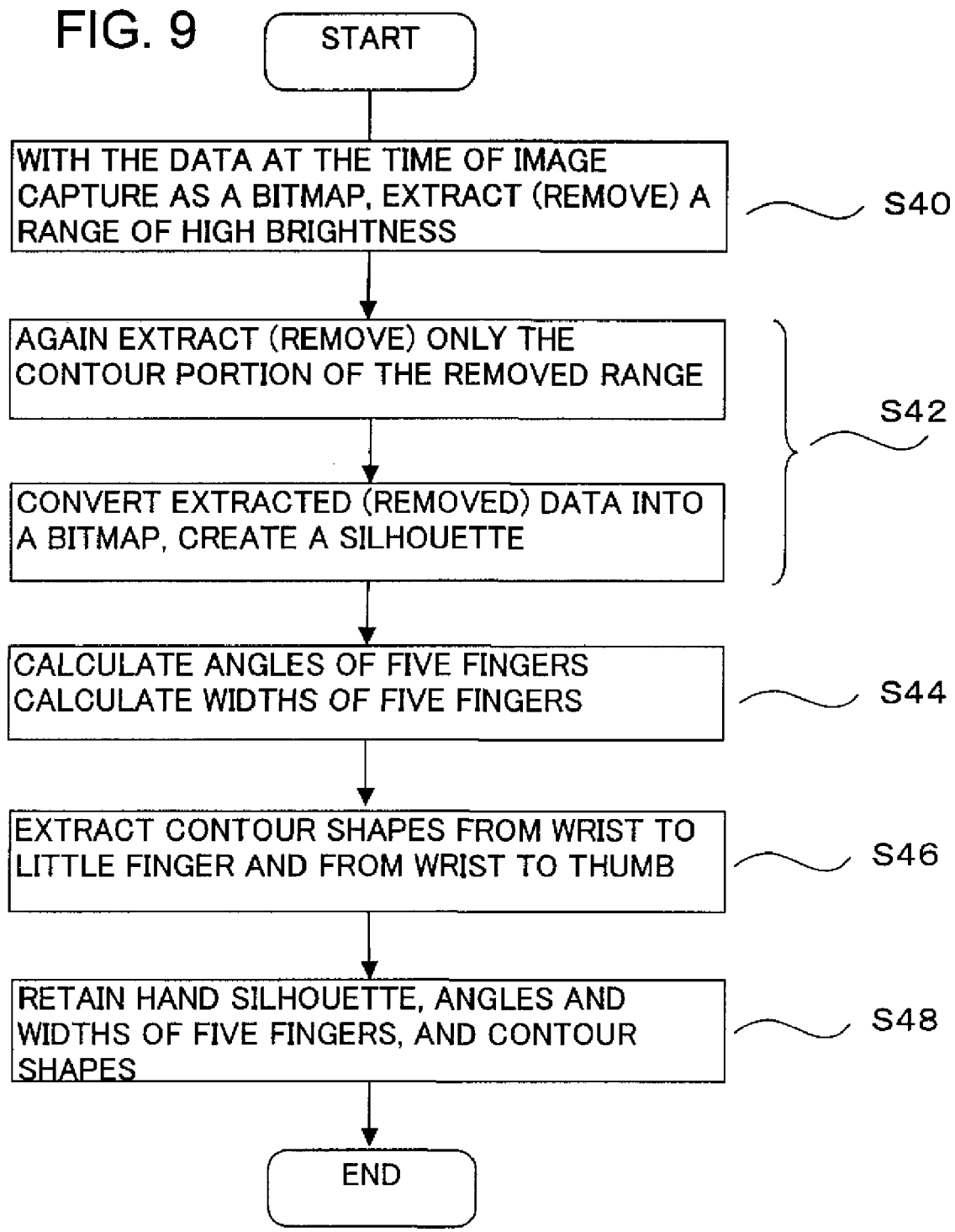
FIG. 9: Diagram of the flow of body image capture state extraction processing of FIG. 5.
Figure 10:
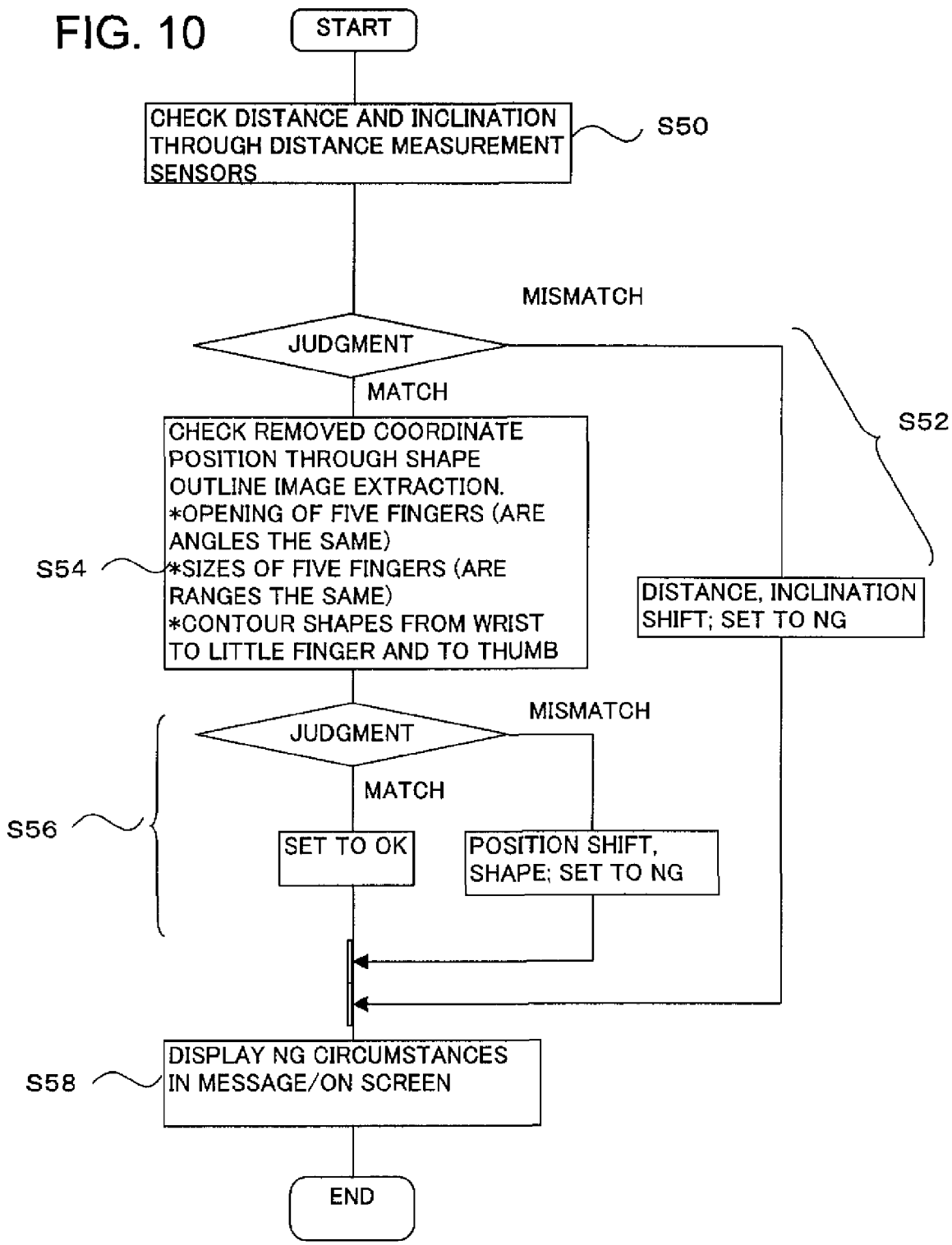
FIG. 10: Diagram of the flow of body image capture state check processing of FIG. 6.

FIG. 9 shows the flow of body image capture state extraction processing in FIG. 5, FIG. 10 shows the flow of body image capture state check processing in FIG. 6, and FIG. 11 and FIG. 12 explain guidance screens resulting from body image capture checking.

Next, the body image capture data (body shape outline image) extraction processing of FIG. 5 is explained, referring to FIG. 9.

(S40) A high-brightness range (that is, portions of the palm with high reflectivity) is extracted (cut out) from among the captured image data in the image capture range V.

(S42) Only the contour portion of the cut out range is again extracted. By this means, outline data for the palm of the hand in the image capture range V is obtained. This extracted data is converted into a bitmap, and a silhouette showing only the outline of the hand is created. The hand silhouette image is a bitmap of the extracted outline data, as indicated by the dotted lines in FIG. 7 and FIG. 8, and does not include the image capture data within the outline. As a result, even when the silhouette of the hand is stored or displayed, recognition of the information within the silhouette, which is to be used for authentication, can be prevented.

(S44) Next, the angles A1, A2, A3, A4, A5 of the five fingers and the widths W1, W2, W3, W4, W5 of the five fingers of the hand (see FIG. 4) are calculated from the above-described outline data.

(S46) Further, the contour CB from the wrist to the little finger, and the contour CA from the wrist to the thumb, are extracted from the above-described outline data.

(S48) Then, the hand silhouette, angles A1, A2, A3, A4, A5 of the five fingers of the hand, widths W1, W2, W3, W4, W5 of the five fingers of the hand, contour CB from the wrist to the little finger, and contour CA from the wrist to the thumb, which are image capture state data, are stored.

Next, the body image capture state check processing of FIG. 6 is explained using FIG. 10, referring to the guidance screens of FIG. 11 and FIG. 12.

(S50) The distance and inclination are measured from the output of the distance sensors 15, and a check is performed to ensure that the distance and inclination are within appropriate ranges, similarly to step S10.

(S52) If the distance or inclination is not in the appropriate range (case of a mismatch), the distance or inclination is set to NG, and processing proceeds to step S58.

(S54) If the distance and inclination are appropriate (case of a match), shape outline image extraction is used to check the cut out coordinate position. That is, the registered angles A1, A2, A3, A4, A5 of the five fingers of the hand and the angles of the five fingers extracted in the processing of FIG. 9 are each compared, to judge whether the angles are the same for each finger. Similarly, the registered widths W1, W2, W3, W4, W5 of the five fingers of the hand are compared with the widths of the five fingers extracted in the processing of FIG. 9, and a judgment is made as to whether the widths of the fingers are each within prescribed ranges of the registered widths. Moreover, a judgment is made as to whether the registered contours CB from the wrist to the little finger and CA from the wrist to the thumb match the contours CB from the wrist to the little finger and CA from the wrist to the thumb extracted in the processing of FIG. 9.

(S56) In the above-described comparisons, if all factors match and are in the prescribed ranges (called a "match"), the image capture state is set to OK. If on the other hand, in the above-described comparisons, any of the factors do not match or are not in the prescribed ranges (called a "mismatch"), either position-shift or shape NG is set, according to the cause.

(S58) The above-described NG circumstances are displayed in a message or image.

This is explained using FIG. 11 and FIG. 12. When for example the registered contours CB from the wrist to the little finger and CA from the wrist to the thumb do not match the contours CB from the wrist to the little finger or CA from the wrist to the thumb extracted in the processing of FIG. 9, there is a shift in the position of the hand. And, as indicated in the screen G6-1 in FIG. 11, the guidance message "Please place your hand according to the guide line" is displayed. In the case of an inclination NG, as indicated in the screen G6-2 in FIG. 11, the shift in hand inclination results in the guidance message "Your hand is inclined to the right (or to the left). Please place your hand such that the guide line indicating the center inclination is square" is displayed.

If the result of comparison of the registered angles A1, A2, A3, A4, A5 of the five fingers of the hand with the angles of the five fingers extracted in the processing of FIG. 9 is not a match, then as shown in screen G6-3 in FIG. 12, the index finger, middle finger, ring finger, or little finger is not opened, or the thumb is closed as shown in the screen G6-4 in FIG. 12. And the guidance message "Please open your fingers" is displayed. Similarly, as shown in the screen G6-5 in FIG. 12, when the fingers are opened too wide, the guidance message "Please place your hand along the guide lines" is displayed.

Further, when an NG has been set because the widths of the fingers are not within the prescribed ranges with respect to the registered widths, the fingers are either drooping downward or are in a curved state, and so a similar guidance message, "Please stretch your fingers", is displayed.

In this way, insufficient opening of the fingers, excessive opening of the fingers, shifts in the hand position (forward or rearward, right or left), and shifts in distance or inclination, relative to the image capture state at the time of registration are detected, and guidance is provided to reproduce the image capture state at the time of registration. Hence at the time of verification the user can be guided into the image capture state at the time of registration, contributing to improved precision and speed of biometrics authentication. In particular, the refusal rate of incidents in which the verification result is not satisfactory even when the user is the individual in question can be reduced.

Biometrics Authentication Processing

Figure 13:
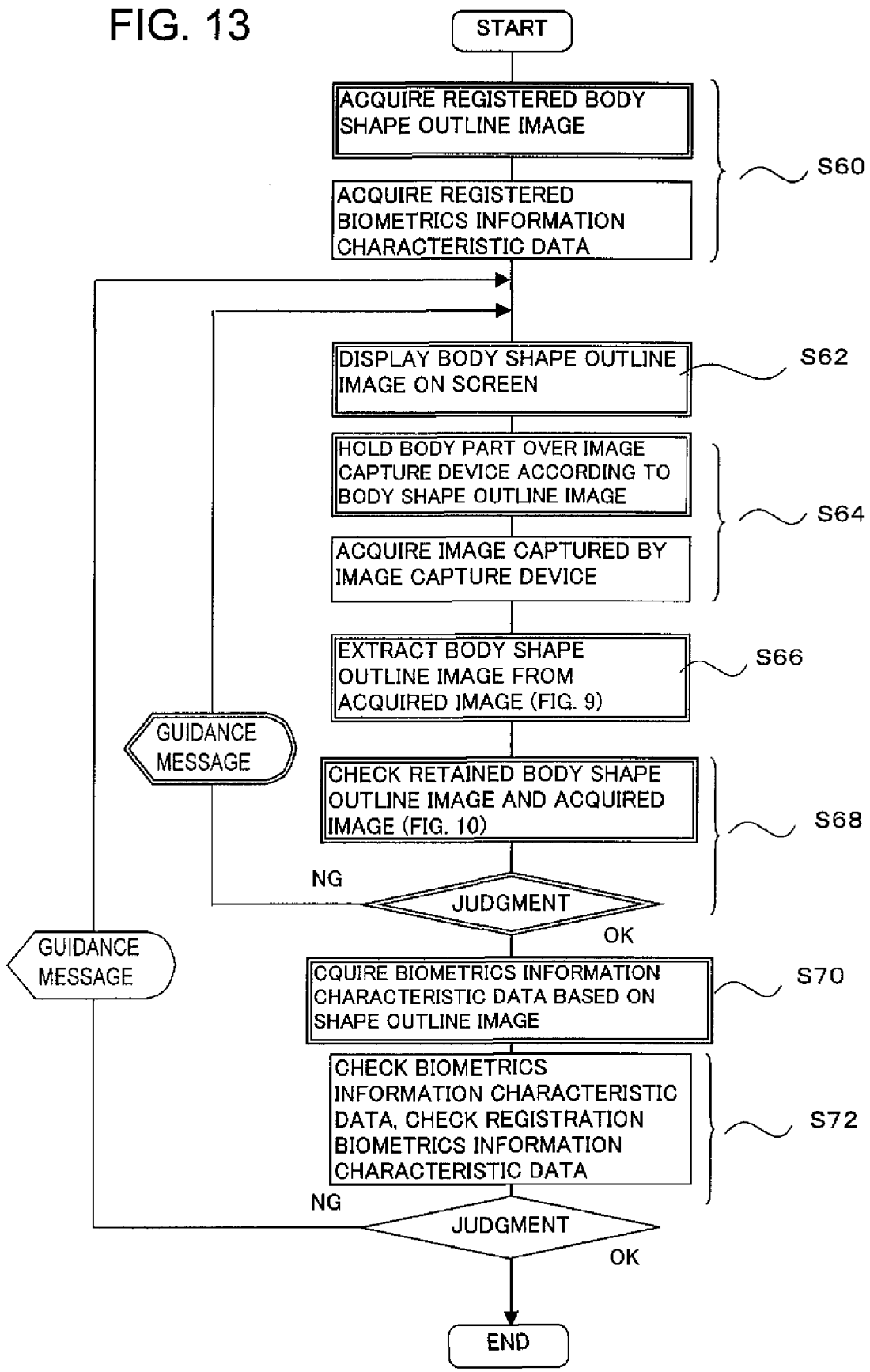
FIG. 13: Diagram of the biometrics data authentication processing flow of an embodiment of the invention.
Figure 14:
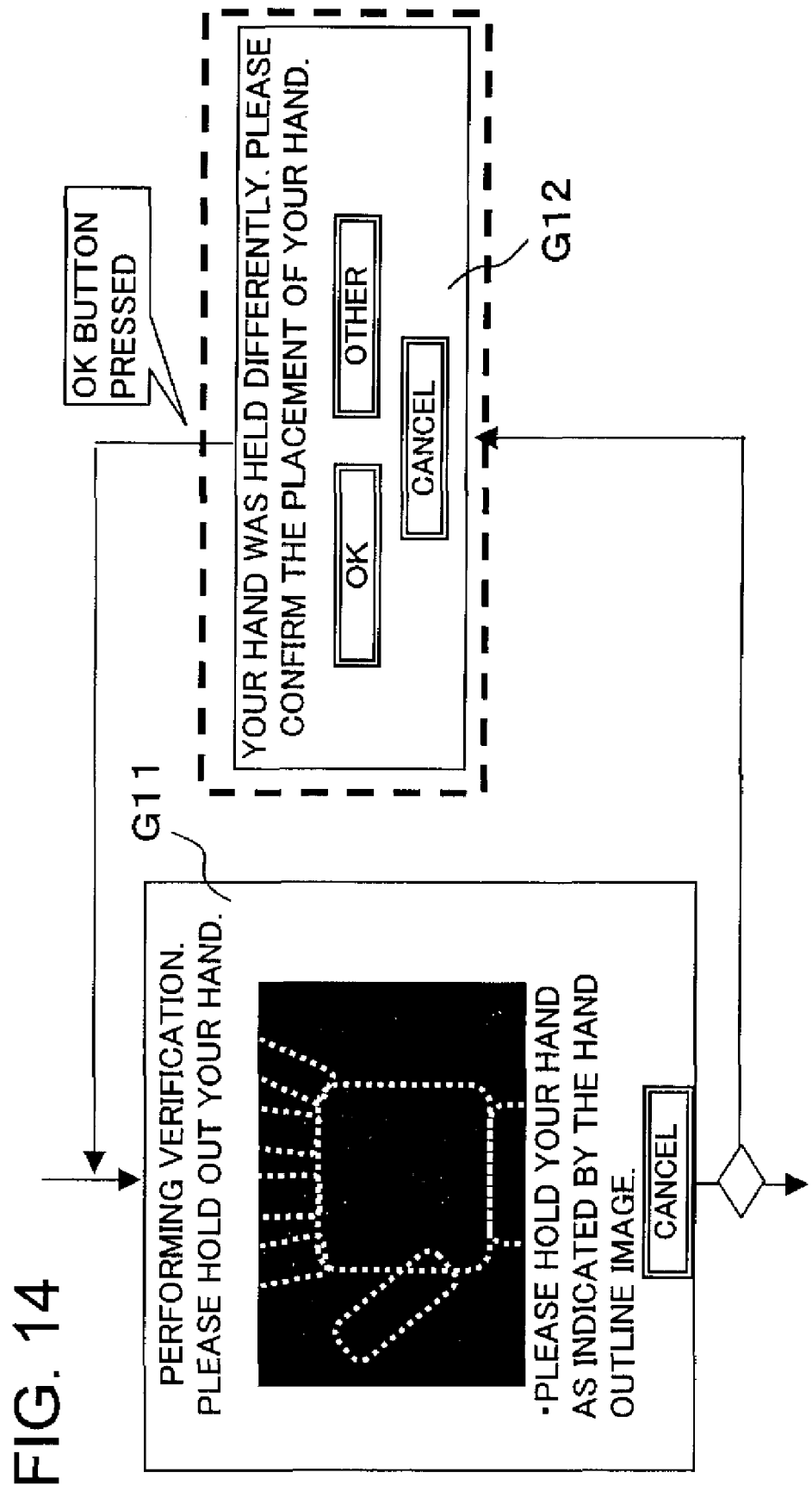
FIG. 14: Diagram explaining guidance screens in the authentication processing of FIG. 13.

FIG. 13 shows the flow of biometrics authentication processing in one embodiment of the invention, and FIG. 14 explains a guidance screen.

(S60) From the ID number of the user, input from the keyboard 3-3 shown in FIG. 1 or from the IC card 5, the corresponding biometrics registration data (three registered blood vessel image data sets, image capture state data) is read in the storage portion 4a (5).

(S62) A silhouette of a hand, which is image capture state data, is displayed on the display device 3-2. FIG. 14 shows the display screen; the registered hand silhouette is displayed on the verification start screen G11, showing the image capture state at the time of registration of the user.

(S64) When the user holds his hand over the image capture device 1, the near-infrared rays are emitted from the image capture device 1, and an image of the palm of the hand is obtained.

(S66) An outline image of the palm of the hand is detected from the image captured by the image capture device 1. That is, as shown in FIG. 4, an image of the outline of the hand within the image capture range V is extracted. Then, as explained in FIG. 9, the angles A1, A2, A3, A4, A5 of the five fingers of the hand and the widths W1, W2, W3, W4, W5 of the five fingers of the hand are calculated from the outline image of the hand. As shown in FIG. 3, a silhouette of the hand, the angles A1, A2, A3, A4, A5 of the five fingers of the hand, the widths W1, W2, W3, W4, W5 of the five fingers of the hand, the contour CB from the wrist to the little finger, and the contour CA from the wrist to the thumb, are acquired.

(S68) As explained in FIG. 10, the read-out body shape outline image and the body shape outline image (image capture state data) acquired in step S66 are compared and checked. In this checking, if it is judged that a portion of the factors (data) does not match between the body shape outline image (image capture state data) read out and the body shape outline image (image capture state data) acquired in step S66, then the message screen G12 in FIG. 14 indicating that the manner of holding the hand is different is displayed, and processing returns to step S62.

(S70) On the other hand, if it is judged that there is a match between all the factors (data) of the read-out body shape outline image (image capture state data) and the body shape outline image (image capture state data) acquired in step S66, biometrics characteristic data is extracted from the captured image. As shown in FIG. 4, blood vessel image data for the palm of the hand is extracted, as biometrics characteristic data, from the image in the characteristic extraction range V1. In this case, in addition to extracting the blood vessel image itself, image processing may be performed to extract vector components of blood vessels from the blood vessel image.

(S72) The read-out blood vessel image data is compared with the blood vessel image data extracted in step S70, and the degree of similarity is calculated. As explained in step S26, a degree of similarity is a quantity indicating the extent to which two blood vessel image patterns match; various pattern-matching techniques can be employed. If the degree of similarity is equal to or greater than a threshold value determined in advance, the two are judged to be similar (OK), and the authentication result is judged to be satisfactory (OK). If on the other hand the degree of similarity does not exceed the threshold value, the two are judged not to be similar (NG). Then, similarly to step S22, a repeated operation guidance message G6 is displayed, and processing returns to step S62.

In this way, the user is guided into the image capture state at the time of registration, biometrics characteristic data is extracted, and verification is performed, so that the precision and speed of biometrics authentication can be improved. In particular, the refusal rate for the individual in question is reduced.

Other Body Image Capture State Guidance Processing

FIG. 15 through FIG. 18 explain body image capture state guidance processing in other embodiments of the invention. FIG. 15 through FIG. 17 explain guidance screens during the above-described three registrations.

As shown in FIG. 15, upon the start of the initial registration (step S10 in FIG. 5 and guidance screen G1 in FIG. 7), the hand silhouette ST which is the reference for the device is displayed by means of a dotted line on the display device 3-2. When acquiring the outline image, the captured image CG is displayed in superposition on the reference silhouette ST on the display device 3-2. Next, as shown in FIG. 16 and FIG. 17, at the time of registration the acquired hand silhouette CS is displayed as a dotted line on the display device 3-2, and an image is captured and is displayed superpositioned on the captured image CG.

Similarly, as shown in FIG. 18, at the time of verification the registered hand silhouette CS is displayed as a dotted line on the display device 3-2, and upon capturing an image the captured image CG is displayed in superposition. At this time, if a shift is detected during the above-described body image capture state check, the message "Please place your hand along the guide lines" is displayed. If no shift is detected in the above-described body image capture state check, the message "Please do not move your hand" is displayed.

In this way, by displaying the captured image superpositioned on the registered hand silhouette, the user can visually perceive differences between the image capture state at the time of registration and the image capture state at the time of verification, so that guidance into the image capture state of the time of registration can be more efficient.

Another Biometrics Authentication Device

FIG. 19 shows the configuration of the biometrics authentication device of another embodiment of the invention. This embodiment is an example of application of a biometrics authentication mechanism to an entry/leaving device. As shown in FIG. 19, the biometrics authentication device 6 has an image capture device (biometrics detection device) 1, an authentication result display 6-2, and an input key group 6-1. The image capture device 1 comprises the palm image capture device explained in FIG. 2. The biometrics authentication device 6 has, on an internal control board, a processor which performs the various processing explained in FIG. 2, and a storage portion 4a.

This biometrics authentication device 6 is connected to an electric lock control board 7, which drives the opening and closing of a door 8 which is opened and closed under motorized control. The biometrics authentication device 6 is connected to a monitor display device 3-2. The above-described palm guidance screens are displayed on this monitor display device 3-2. The guidance screens are particularly effective in guiding users who are not familiar with registration or operation.

Other Embodiments

In the above-described embodiments, biometrics authentication has been explained for the case of palm vein pattern authentication; but applications which utilize the characteristics of blood vessel images of the back of the hand and the fingers, as well as to palmprints and other characteristics of the hand, in addition to contact-free biometrics authentication using retina images, facial authentication, and similar, are also possible.

Further, explanations assumed logging onto a PC and an entry/leaving device as application areas; but application to ATMs (Automatic Teller Machines) and other financial services, rental services, and other tasks and services requiring individual authentication is possible. Further, in explanations bitmap pattern matching techniques were used to calculate degrees of similarity; but well-known techniques in which data is expressed in vector form, and the directions and lengths of vectors are used to calculate degrees of similarity, can also be used.

In the above, embodiments of the invention have been explained; but various modifications to the invention are possible within the scope of the invention, and these modifications are not excluded from the scope of the invention.

At the time of registration of biometrics characteristic data, body image capture state data is extracted from a captured image and is registered, and at the time of verification the registered image capture state data is read and compared with image capture state data extracted at the time of verification, and guidance of the body is provided, or, an outline of the body at the time of registration from the image capture state data at the time of registration is displayed, so that individual users can be guided into the image capture state at the time of registration, and characteristic data can be extracted. Hence even when a user does not recognize the image capture state at the time of registration, at the time of verification the image capture state of the time of registration can be reproduced, and contact-free detection of biometrics characteristic data can be performed. In particular, verification failures even when the user is the individual in question can be prevented, and moreover the time for verification can be shortened, contributing to improve the reliability of biometrics authentication.

What is claimed is:

1. A biometrics authentication device, which verifies registered biometrics characteristic data for a user against biometrics characteristic data detected from a body to perform individual authentication, comprising:
an image capture unit, which captures an image of a hand;
a storage unit, which stores said biometrics characteristic data of the hand and body image capture state data which indicate a position of the hand for the user;
a display unit, which displays guidance screens to the user for use in image capture of the hand; and
a processing unit, which extracts the body image capture state data and biometrics characteristic data which indicate the position of the hand from the images of the hand captured by the image capture unit and registers the extracted body image capture state data and biometrics characteristic data in the storage unit,
wherein the processing unit displays on the display unit, as the registered body image capture state data of the hand, an outline of the captured image of the hand, extracts the body image capture state data from images of the hand captured by the image capture unit, compares the extracted body image capture state data of the hand with the body image capture state data registered for the user, displays a guidance screen which indicates a guide direction of the hand according to the comparison result on the display unit, and verifies the biometrics characteristic data registered for the user against the biometrics characteristic data detected from the body.

2. The biometrics authentication device according to claim 1, wherein the body image capture state data indicates the position of the hand in an image capture range of the image capture unit.

3. The biometrics authentication device according to claim 2, wherein the processing unit extracts, as body image capture state data indicating the position of the hand, the position in a horizontal direction and in a vertical direction of the hand relative to the image capture unit.

4. The biometrics authentication device according to claim 1, wherein the image capture unit comprises an image capture unit which captures images of a portion of a hand,
and wherein the processing unit extracts an outline of a portion of the hand of which an image is captured, from the captured image, and displays the outline on the display unit.

5. The biometrics authentication device according to claim 1, wherein the image capture device captures an image of a portion of a hand comprising a palm and a portion of fingers of the hand of the body.

6. The biometrics authentication device according to claim 1, wherein the processing unit displays on the display unit the captured image, superposed on the outline of the captured image of the body.

7. The biometrics authentication device according to claim 1, wherein the processing unit extracts, as body image capture state data indicating the position of the hand, a first outline data from a wrist to a thumb and a second outline data from the wrist to a little finger.

8. A biometrics authentication device, which verifies registered biometrics characteristic data for a user against biometrics characteristic data detected from a body to perform individual authentication, comprising:
an image capture unit, which captures an image of the body;
a storage unit, which stores said biometrics characteristic data and body image capture state data for the user;
a display unit, which displays guidance screens to the user for use in image capture of the body; and
a processing unit, which extracts the body image capture state data and biometrics characteristic data from the images of the body captured by the image capture unit and registers the extracted body image capture state data and biometrics characteristic data in the storage unit,
wherein the processing unit extracts the body image capture state data from images of the body captured by the image capture unit, compares the extracted body image capture state data with the body image capture state data registered for the user, displays a guidance screen on the display unit according to the comparison result, and verifies the biometrics characteristic data registered for the user against the biometrics characteristic data detected from the body, wherein the image capture unit comprises an image capture unit which captures images of a portion of a hand, and wherein the processing unit extracts the position of fingers, which are a portion of the hand of which an image is captured, from the captured image, as the extracted body image state data, compares the position of fingers with the position of fingers registered for the user and displays the guidance screen which indicates a guide direction of the hand according to the comparison result on the display unit.

9. The biometrics authentication device according to claim 8, wherein the processing unit extracts the angles of the fingers, which are a portion of the hand of which an image is captured, from the captured image, as the extracted body image state data.

10. The biometrics authentication device according to claim 8, wherein the processing unit extracts the position of a wrist, which is a portion of the hand of which an image is captured, from the captured image, as the extracted body image state data.

11. The biometrics authentication device according to claim 8, wherein the processing unit extracts the width of the fingers, which are a portion of the hand of which an image is captured, from the captured image, as the extracted body image state data.

12. A living body guidance control method of a biometrics authentication device, which verifies registered biometrics characteristic data against biometrics characteristic data detected from a body to perform individual authentication, comprising:

a first step of capturing an image of a hand by an image capture unit;

a second step of extracting body image capture state data which indicate a position of the hand and the biometrics characteristic data of the hand from the image of the hand captured by the image capture unit, and of registering the extracted body image capture state data and the biometrics characteristic data in a storage unit;

a third step of extracting body image capture state data from an image of the hand captured by the image capture unit, and of comparing the extracted body image capture state data of the hand with the body image capture state data registered in the storage unit;

a fourth step of displaying, on a display unit, a guidance screen which indicates a guide direction of the hand according to the comparison result;

a fifth step of verifying the biometrics characteristic data registered in the storage unit against the biometrics characteristic data detected from the captured image; and further comprising a sixth step of displaying an outline of the captured image of the hand on the display unit before the third step.

13. The living body guidance control method of a biometrics authentication device according to claim 12, wherein the comparison step comprises a step of comparing, as the image capture state data, body image capture state data indicating the position of the hand in the image capture range of the image capture unit, obtained from the captured image of the body.

14. The living body guidance control method of a biometrics authentication device according to claim 13, wherein the comparison step comprises a step of comparing, as body image capture state data indicating the position of the hand, the position in a horizontal direction and in a vertical direction of the hand relative to the image capture unit.

15. The living body guidance control method of a biometrics authentication device according to claim 12, wherein the sixth step comprises:

a step of extracting, from the image captured by the image capture unit, an outline of a portion of a hand of which an image is captured; and a step of displaying the outline on the display unit.

16. The living body guidance control method of a biometrics authentication device according to claim 12, wherein the image capture step comprises a step of capturing an image of a portion of a hand comprising a palm and a portion of fingers of the hand of the body.

17. The living body guidance control method of a biometrics authentication device according to claim 12, wherein the fourth step comprises a step of displaying on the display unit the captured image, superposed on the outline of the captured image of the body.

18. A living body guidance control method of a biometrics authentication device, which verifies registered biometrics characteristic data against biometrics characteristic data detected from a body to perform individual authentication, comprising:

a step of capturing an image of the body by means of an image capture unit;

a step of extracting body image capture state data and the biometrics characteristic data from the image of the body captured by the image capture unit, and of registering the extracted body image capture state data and the biometrics characteristic data in a storage unit;

a step of extracting body image capture state data from an image of the body captured by the image capture unit, and of comparing the extracted body image capture state data with the body image capture state data registered in the storage unit;

a step of displaying, on a display unit, a guidance screen according to the comparison result; and a step of verifying the biometrics characteristic data registered in the storage unit against the biometrics characteristic data detected from the captured image, wherein the comparison step comprises a step of comparing positions of fingers, which are a portion of the hand extracted from the image captured by the image capture unit, and the displaying step comprises, a step of displaying, on a display unit, the guidance screen which indicates a guide direction of the hand according to the comparison result.

19. The living body guidance control method of a biometrics authentication device according to claim 18, wherein the comparison step comprises a step of comparing the angles of the fingers, which are a portion of the hand extracted from the captured image, as the body image capture state data.

20. The living body guidance control method of a biometrics authentication device according to claim 18, wherein the comparison step comprises a step of comparing the position of a wrist, which is a portion of the hand extracted from the captured image, as the body image capture state data.

21. The living body guidance control method of a biometrics authentication device according to claim 18, wherein the comparison step comprises a step of comparing the widths of the fingers, which are a portion of the hand extracted from the captured image, as the body image capture state data.

* * * * *